(12) United States Patent
Saitou

(10) Patent No.: US 7,046,246 B2
(45) Date of Patent: May 16, 2006

(54) GRAPHIC EDITING APPARATUS GRAPHIC EDITING METHOD AND STORAGE MEDIUM ON WHICH IS RECORDED A PROGRAM FOR GRAPHIC EDITING

(75) Inventor: Nobuhiro Saitou, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 48 days.

(21) Appl. No.: 09/432,113

(22) Filed: Nov. 2, 1999

(65) Prior Publication Data

US 2002/0154117 A1 Oct. 24, 2002

(30) Foreign Application Priority Data

Mar. 29, 1999 (JP) .......................... 11-085587

(51) Int. Cl.
G06T 11/20 (2006.01)
G09G 5/00 (2006.01)
G06F 6/00 (2006.01)
G06F 9/00 (2006.01)
G06F 17/00 (2006.01)

(52) U.S. Cl. .................. 345/440; 345/672; 345/676; 715/764; 715/769

(58) Field of Classification Search ........... 345/440, 345/619, 672, 676, 680, 788; 715/700, 763, 715/764, 769
See application file for complete search history.

(56) References Cited

U.S. PATENT DOCUMENTS

| 5,278,951 | A | * | 1/1994 | Camacho et al. | 345/440 |
| 5,432,897 | A | * | 7/1995 | Tatsumi et al. | 345/440 |
| 5,515,488 | A | * | 5/1996 | Hoppe et al. | 345/440 |
| 5,596,691 | A | * | 1/1997 | Good et al. | 345/440 |
| 5,680,530 | A | * | 10/1997 | Selfridge et al. | 345/440 |
| 5,745,113 | A | * | 4/1998 | Jordan et al. | 345/440 |
| 5,829,003 | A | | 10/1998 | Okura | |
| 5,999,192 | A | * | 12/1999 | Selfridge et al. | 345/440 |
| 6,154,220 | A | * | 11/2000 | Prakriya et al. | 345/440 |
| 6,377,259 | B1 | * | 4/2002 | Tenev et al. | 345/440 |

FOREIGN PATENT DOCUMENTS

| JP | 4-24733 | 1/1992 |
| JP | 4-267482 | 9/1992 |
| JP | 5-307476 | 11/1993 |
| JP | 7-306864 | 11/1995 |
| JP | 8-272842 | 10/1996 |
| JP | 9-6982 | 1/1997 |
| JP | 11-296357 | 10/1999 |

OTHER PUBLICATIONS

JPO Office Action, Sep. 30, 2003.

* cited by examiner

Primary Examiner—Sumati Lefkowitz
Assistant Examiner—Chante Harrison
(74) Attorney, Agent, or Firm—Staas & Halsey LLP

(57) ABSTRACT

A flowchart including objects A through C is displayed on the monitor of a computer. If an object D is inserted between objects A and B, object D is dropped on a line AB. By this operation, objects A and D are automatically connected, and objects D and B are automatically connected.

19 Claims, 47 Drawing Sheets

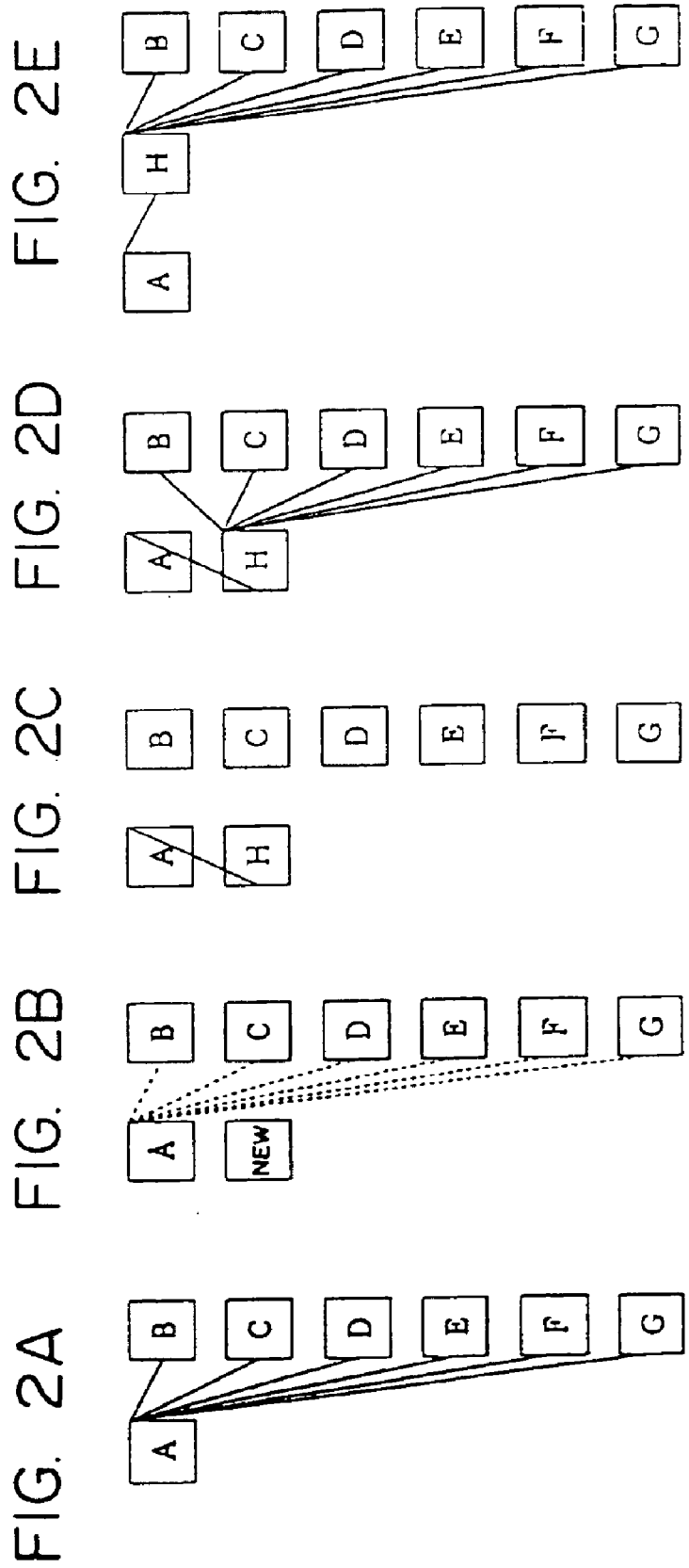

| ARRAY 1 | DISPLAY INFORMATION | POSITION INFORMATION | ADDITIONAL INFORMATION |
|---|---|---|---|
| 00 | A | 31 | |
| 01 | B | 30 | |
| 02 | | | |

↓ VALUE OF THE ARRAY 4 OF DATA TABLE

F I G. 6 A

| ARRAY 2 | FRONT INFORMATION | REAR INFORMATION | ADDITIONAL INFORMATION |
|---|---|---|---|
| 10 | 00 | 01 | |
| 11 | | | |

↓ VALUE OF THE ARRAY 1 OF OBJECT INFORMATION TABLE

F I G. 6 B

| ARRAY 3 | SELECTION INFORMATION | ADDITIONAL INFORMATION |
|---|---|---|
| 20 | 10 | |
| 21 | | |

↓ VALUE OF THE ARRAY 2 OF LINE INFORMATION TABLE

F I G. 6 C

| ARRAY 4 | NAME OF DATA | PRECEDING INFORMATION | X COORDINATE | Y COORDINATE | ADDITIONAL INFORMATION |
|---|---|---|---|---|---|
| 30 | B | A | 001 | 000 | |
| 31 | A | | 000 | 000 | |
| 32 | | | | | |

| ARRAY 4 | NAME OF DATA | PRECEDING INFORMATION | X COORDINATE | Y COORDINATE | ADDITIONAL INFORMATION |
|---|---|---|---|---|---|
| 30 | B | A | 0 0 | 0 0 | |
| 31 | | | 0 0 | 0 0 | |
| 32 | A | — | 0 1 | 0 0 | |
| | | | 0 0 | 0 0 | |
| | | | 0 0 | 0 0 | |
| | | | 0 1 | 0 0 | |

FIG. 8B

| ARRAY 2 | FRONT INFORMATION | REAR INFORMATION | ADDITIONAL INFORMATION |
|---|---|---|---|
| 10 | 0 0 | 0 1 → 0 2 | |
| 11 | 0 2 | 0 1 | |

| ARRAY 1 | DISPLAY INFORMATION | POSITION INFORMATION | ADDITIONAL INFORMATION |
|---|---|---|---|
| 00 | A | 31 | |
| 01 | B | 30 | |
| 02 | NEW | 32 | |

↓ VALUE OF THE ARRAY 4 OF DATA TABLE

F I G. 9 A

| ARRAY 2 | FRONT INFORMATION | REAR INFORMATION | ADDITIONAL INFORMATION |
|---|---|---|---|
| 10 | 00 | 02 | |
| 11 | 02 | 01 | |

↓ ↓ VALUE OF THE ARRAY 1 OF OBJECT INFORMATION TABLE

F I G. 9 B

| ARRAY 4 | NAME OF DATA | PRECEDING INFORMATION | X COORDINATE | Y COORDINATE | ADDITIONAL INFORMATION |
|---|---|---|---|---|---|
| 30 | B | | 002 | 000 | |
| 31 | A | — | 000 | 000 | |
| 32 | NEW | A | 001 | 000 | |

F I G. 9 C

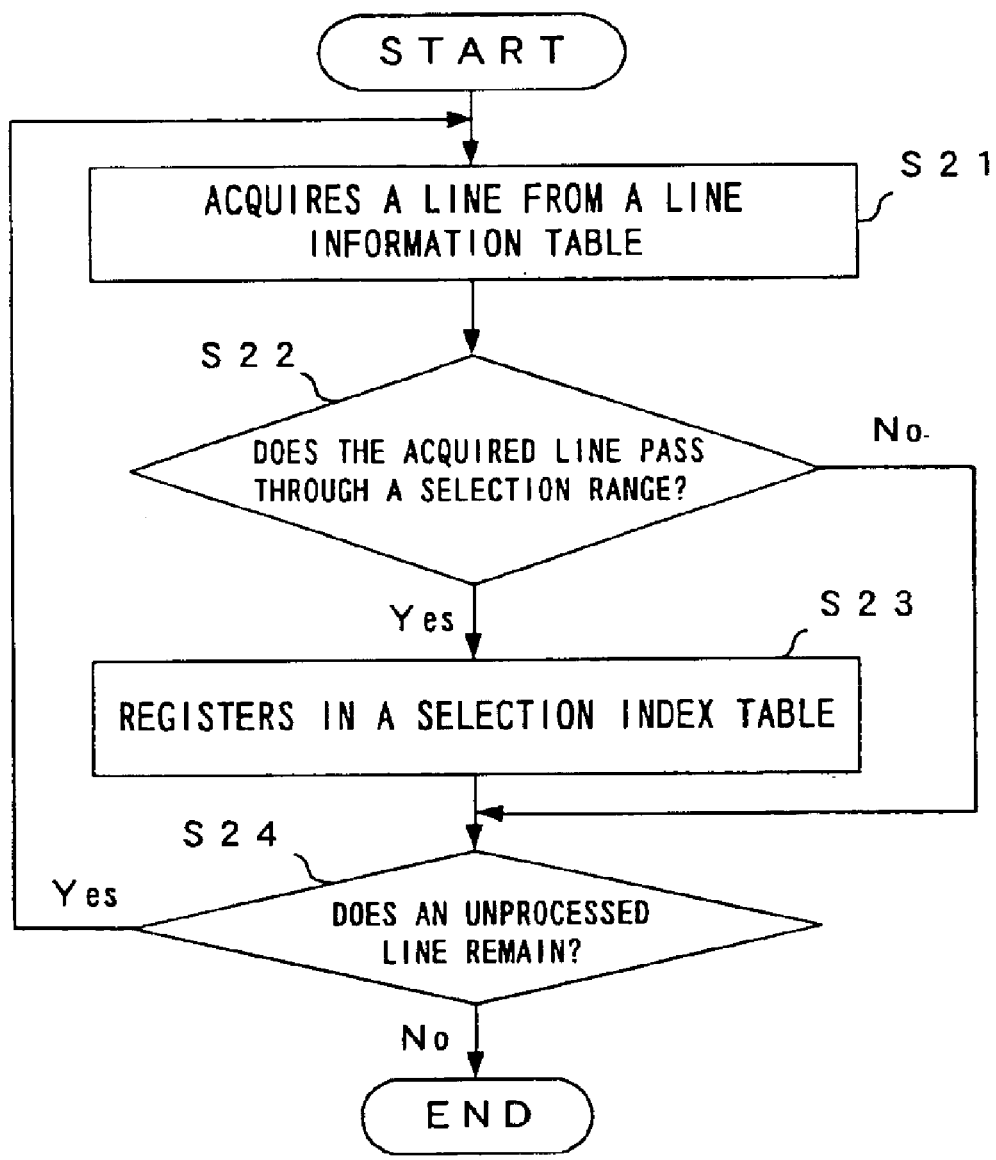
F I G. 1 2

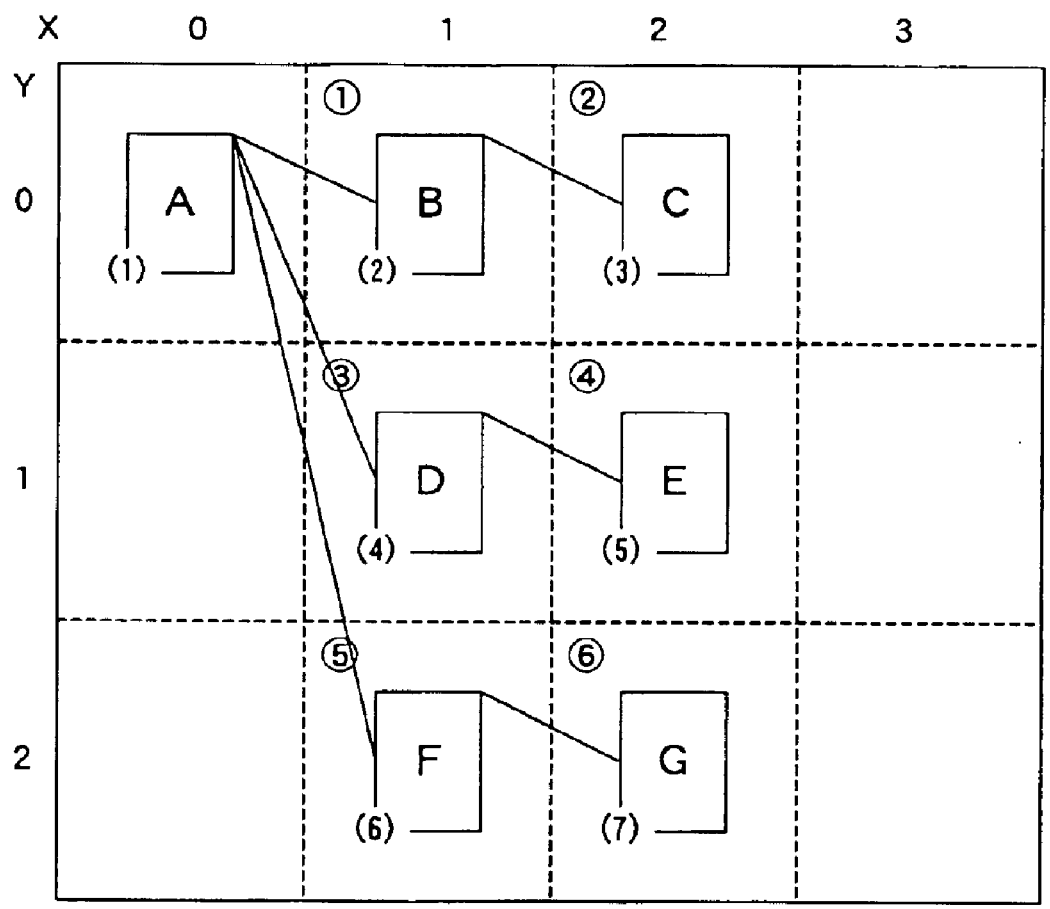
F I G. 1 9

| ARRAY1 INDEX | OBJECT NUMBER | DISPLAY INFORMATION | VIRTUAL X COORDINATE | VIRTUAL Y COORDINATE | ADDITIONAL INFORMATION |
|---|---|---|---|---|---|
| 1 | (1) | A | 000 | 000 | |
| 2 | (2) | B | 001 | 000 | |
| 3 | (3) | C | 002 | 000 | |
| 4 | (4) | D | 001 | 001 | |
| 5 | (5) | E | 002 | 001 | |
| 6 | (6) | F | 001 | 002 | |
| 7 | (7) | G | 002 | 002 | |

F I G. 2 0 A

| ARRAY2 INDEX | CONNECTING LINE NUMBER | FRONT INFORMATION | REAR INFORMATION |
|---|---|---|---|
| 1 | ① | 1 | 2 |
| 2 | ② | 2 | 3 |
| 3 | ③ | 1 | 4 |
| 4 | ④ | 4 | 5 |
| 5 | ⑤ | 1 | 6 |
| 6 | ⑥ | 6 | 7 |

F I G. 2 0 B

| ARRAY 3 | |
|---|---|
| INDEX | SELECTED POSITION |
| 1 | 1 |
| 2 | 3 |

| ARRAY1 INDEX | OBJECT NUMBER | DISPLAY INFORMATION | VIRTUAL X COORDINATE | VIRTUAL Y COORDINATE | ADDITIONAL INFORMATION |
|---|---|---|---|---|---|
| 1 | (1) | A | 000 | 000 | |
| 2 | (2) | B | 001 | 000 | |
| 3 | (3) | C | 002 | 000 | |
| 4 | (4) | D | 001 | 001 | |
| 5 | (5) | E | 002 | 001 | |
| 6 | (6) | F | 001 | 002 | |
| 7 | (7) | G | 002 | 002 | |
| 8 | (8) | | | | |

FIG. 22A ← NEW RECORD IS ADDED

| ARRAY2 INDEX | CONNECTING LINE NUMBER | FRONT INFORMATION | REAR INFORMATION |
|---|---|---|---|
| 1 | ① | 1 | 2 |
| 2 | ② | 2 | 3 |
| 3 | ③ | 1 | 4 |
| 4 | ④ | 4 | 5 |
| 5 | ⑤ | 1 | 6 |
| 6 | ⑥ | 6 | 7 |
| 7 | ⑦ | | |

← NEW RECORD IS ADDED

FIG. 22B

| ARRAY1 INDEX | OBJECT NUMBER | DISPLAY INFORMATION | VIRTUAL X COORDINATE | VIRTUAL Y COORDINATE | ADDITIONAL INFORMATION |
|---|---|---|---|---|---|
| 1 | (1) | A | 000 | 000 | |
| 2 | (2) | B | 001 | 000 | |
| 3 | (3) | C | 002 | 000 | |
| 4 | (4) | D | 001 | 001 | |
| 5 | (5) | E | 002 | 001 | |
| 6 | (6) | F | 001 | 002 | |
| 7 | (7) | G | 002 | 002 | |
| 8 | (8) | | 001 | 000 | |

| ARRAY1 INDEX | OBJECT NUMBER | DISPLAY INFORMATION | VIRTUAL X COORDINATE | VIRTUAL Y COORDINATE | ADDITIONAL INFORMATION |
|---|---|---|---|---|---|
| 1 | (1) | A | 000 | 000 | |
| 2 | (2) | B | 002 | 000 | |
| 3 | (3) | C | 003 | 000 | |
| 4 | (4) | D | 001 | 001 | |
| 5 | (5) | E | 002 | 001 | |
| 6 | (6) | F | 001 | 002 | |
| 7 | (7) | G | 002 | 002 | |
| 8 | (8) | | 001 | 000 | |

| ARRAY2 INDEX | CONNECTING LINE NUMBER | FRONT INFORMATION | REAR INFORMATION |
|---|---|---|---|
| 1 | ① | 1 | 2 |
| 2 | ② | 2 | 3 |
| 3 | ③ | 1 | 4 |
| 4 | ④ | 4 | 5 |
| 5 | ⑤ | 1 | 6 |
| 6 | ⑥ | 6 | 7 |
| 7 | ⑦ | | 8 |

FIG. 24

| ARRAY3 INDEX | SELECTED POSITION |
|---|---|
| 1 | 1 |
| 2 | 3 |

| ARRAY2 INDEX | CONNECTING LINE NUMBER | FRONT INFORMATION | REAR INFORMATION |
|---|---|---|---|
| 1 | ① | ①  | 2 |
| 2 | ② | 2 | 3 |
| 3 | ③ | 1 | 4 |
| 4 | ④ | 4 | 5 |
| 5 | ⑤ | 1 | 6 |
| 6 | ⑥ | 6 | 7 |
| 7 | ⑦ | ① | 8 |

FIG. 25A

| ARRAY3 INDEX | SELECTED POSITION |
|---|---|
| 1 | 1 |
| 2 | 3 |

| ARRAY2 INDEX | CONNECTING LINE NUMBER | FRONT INFORMATION | REAR INFORMATION |
|---|---|---|---|
| 1 | ① | ⑧ | 2 |
| 2 | ② | 2 | 3 |
| 3 | ③ | 1 | 4 |
| 4 | ④ | 4 | 5 |
| 5 | ⑤ | 1 | 6 |
| 6 | ⑥ | 6 | 7 |
| 7 | ⑦ | 1 | ⑧ |

FIG. 25B

| ARRAY1 INDEX | OBJECT NUMBER | DISPLAY INFORMATION | VIRTUAL X COORDINATE | VIRTUAL Y COORDINATE | ADDITIONAL INFORMATION |
|---|---|---|---|---|---|
| 1 | (1) | A | 000 | 000 | |
| 2 | (2) | B | 002 | 000 | |
| 3 | (3) | C | 003 | 000 | |
| 4 | (4) | D | 002 | 001 | |
| 5 | (5) | E | 003 | 001 | |
| 6 | (6) | F | 001 | 002 | |
| 7 | (7) | G | 002 | 002 | |
| 8 | (8) | | 001 | 000 | |

F I G. 2 8 A

| ARRAY2 INDEX | CONNECTING LINE NUMBER | FRONT INFORMATION | REAR INFORMATION |
|---|---|---|---|
| 1 | ① | 8 | 2 |
| 2 | ② | 2 | 3 |
| 3 | ③ | 8 | 4 |
| 4 | ④ | 4 | 5 |
| 5 | ⑤ | 1 | 6 |
| 6 | ⑥ | 6 | 7 |
| 7 | ⑦ | 1 | 8 |

F I G. 2 8 B $(a+\alpha > h)$

F I G. 38A

| INDEX | NAME OF OBJECT | COORDINATE | SHAPE | HEIGHT | WIDTH | |
|---|---|---|---|---|---|---|
| 1 | A | (Px, Py) | RECTANGLE | PH | PW | |
| 2 | B | (Qx, Qy) | RECTANGLE | QH | QW | |
| 3 | C | (Mx, My) | RECTANGLE | MH | MW | |

ADDED →

F I G. 38B

| INDEX | NAME OF LINE | FRONT INFORMATION | REAR INFORMATION | STARTING POINT COORDINATE | END POINT COORDINATE | HEIGHT |
|---|---|---|---|---|---|---|
| 1 | D | A | B | (LSx, LSy) | (LEx, LEy) | LH |
| 2 | E | | | (NSx, NSy) | (NEx, NEy) | NH |

ADDED →

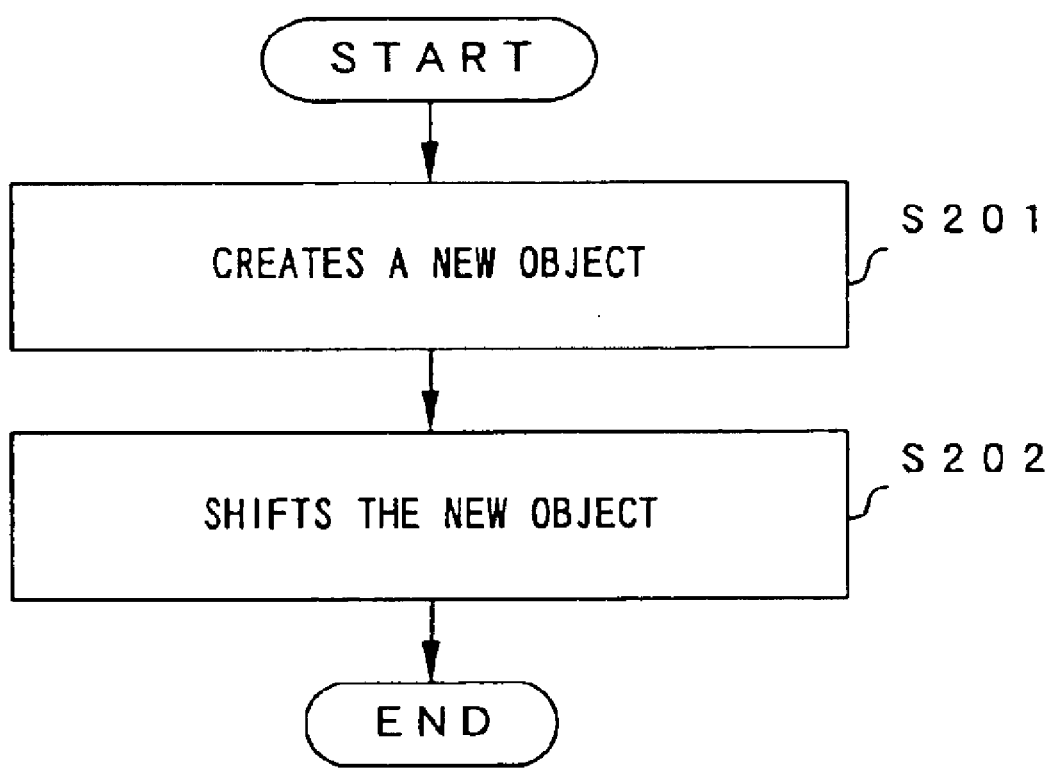
F I G. 40

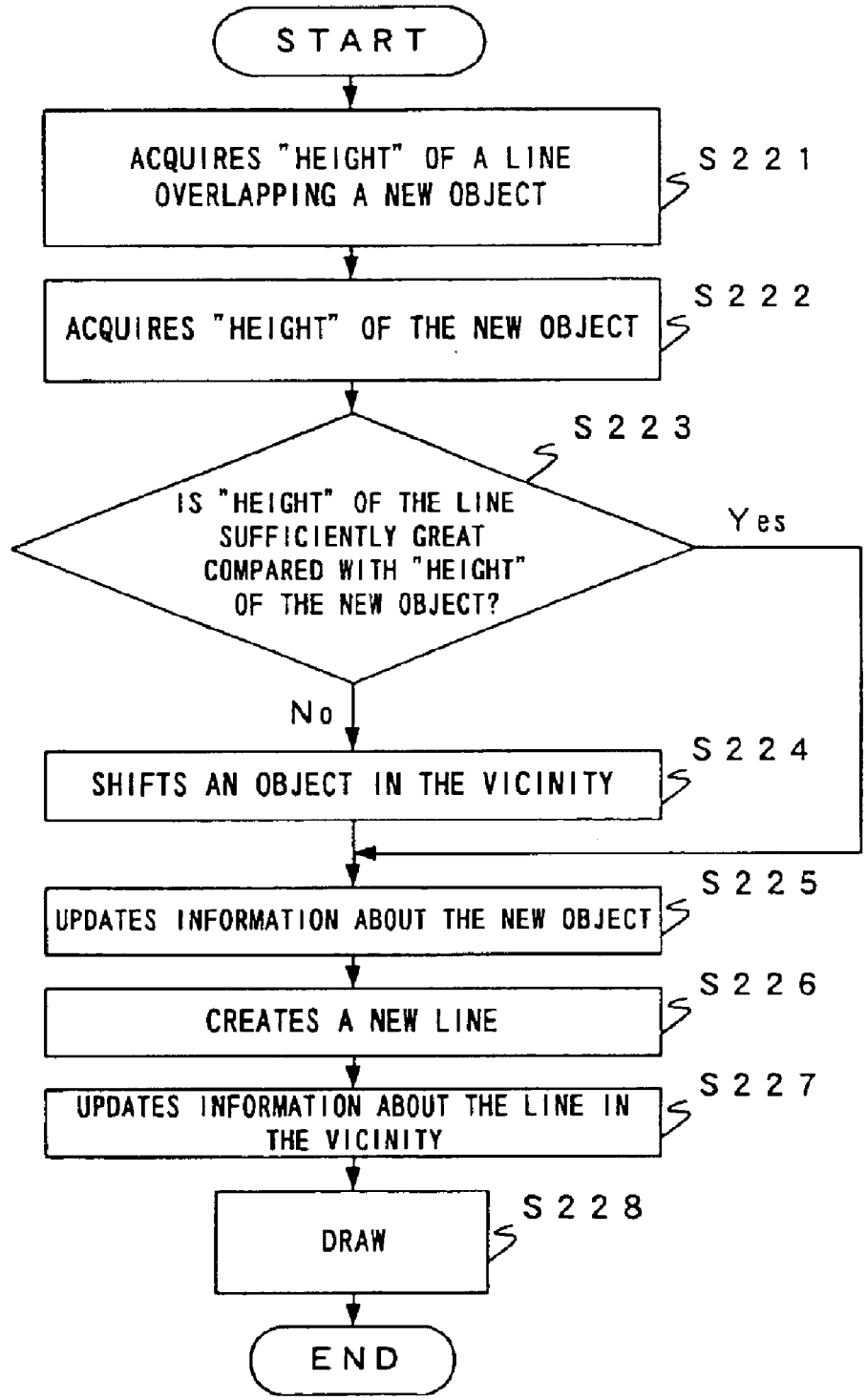
F I G. 42

GRAPHIC EDITING APPARATUS GRAPHIC EDITING METHOD AND STORAGE MEDIUM ON WHICH IS RECORDED A PROGRAM FOR GRAPHIC EDITING

BACKGROUND OF THE INVENTION

1. Field of the Invention

The present invention relates to an apparatus or method for inserting another object between objects connected with each other.

2. Description of the Related Art

Today it is common for a variety of flowcharts to be drawn using a computer. Software, for example, "Power Point" (Microsoft), "Visio" (Visio), etc., with a function to draw a graphic, etc., are well known.

A flowchart is used, for example, to indicate the procedure (or sequence) of a working process and the procedure of the process of a software program, and it usually includes a plurality of objects, and lines or connectors connecting the plurality of objects.

FIG. 1A is an example of a flowchart displayed on the monitor of a computer. In this flowchart, three objects (objects A through C) are connected in alphabetical order. A box formed using dotted lines indicates a display area in a virtual coordinate system, and it is not actually displayed. A rectangle in each box indicates an object. An object drawn using solid lines and an object drawn using dotted lines indicate a state where data are set and a state where data are not set, respectively. Objects drawn using dotted lines are not actually displayed. A character inside an object indicates the content of data linked to the object. A line which connects objects indicates the order or subordinate relationship between the objects in a flowchart. For example, since a line AB (line connecting objects A and B) starts from the upper right corner of object A, it indicates that object A is the object preceding object B and that object B is the object following object A.

When a flowchart is drawn, a case often occurs where in addition to the addition and deletion of an object, a new object is inserted between objects previously connected. For example, a case occurs where a new object D is inserted between objects A and B. In this case, as shown in FIG. 1B, a line connecting objects A and B is deleted. When a line is deleted, two objects at either end of the line are designated or a line to be deleted is designated after a deletion process is called from a menu.

Then, as shown in FIG. 1C, a new object is created, and the new object is linked to data D. A process for creating an object, for example, is called from a menu. Then, as shown in FIG. 1D, objects A and D are connected, and objects D and B are connected. Then, in order to make the flowchart easy to understand, each object is appropriately moved, as shown in FIG. 1E. As a result, a state shown in FIG. 1F is obtained.

As described above, a process for inserting a new object between objects previously connected in a flowchart, etc., is a prior art. However, according to conventional application software, it requires much work for a user to operate in that kind of edit process, and the user often felt it was troublesome. For example, in a example shown in FIGS. 1A through 1F, a user must perform the following operations.

(a) Delete a line displayed in the position where a new object will be inserted.

(b) Connect an object previously displayed and a new object to be inserted.

(c) Re-locate the objects.

This problem becomes more serious in particular when a new object is inserted in a graphic where a connection relation between objects is complicated. For example, a procedure in the case where a state shown in FIG. 2E is generated by inserting object H between object A and objects B through G in the state shown in FIG. 2A is described. In this case, first, lines connecting object A and objects B through G are deleted one by one, as shown in FIG. 2B. Then, as shown in FIG. 2C, object H is created, and objects A and H are connected. Then, as shown in FIG. 2D, object H and objects B through G are connected one by one. Then, in order to make the graphic easy to understand, the objects are re-located, and as a result, a state shown in FIG. 2E is obtained.

In this way, as the number of lines to be deleted or the number of lines to be newly set increases, the amount of work and working time of a user also increase. The probability of errors which occur when a line is deleted or set, also increases.

This problem not only occurs in application software for drawing flowcharts, but it also occurs in software for drawing graphics and software for drawing circuit diagrams, etc.

SUMMARY OF THE INVENTION

An objective of the present invention is to make operation simple in the case where another object is inserted between objects previously connected.

The graphic editing apparatus of the present invention comprises a display unit displaying a graphic including first and second objects connected with each other using a first connector, and an editing unit creating a second connector for connecting the first object and a third object, and a third connector for connecting the third object and the second object, when the third object is located in a predetermined position in relation to the first connector.

The display unit displays the first and second objects, and the first connector, for example, on the monitor of a computer. The third object is moved to a desired position on the monitor, for example, by a user operation.

When the second and third connectors are created by the editing unit, a state where the first, third and second objects are connected in this order is generated. That is to say, a state where the third object is inserted between the first and second objects is obtained.

As described above, the third object can be automatically inserted between the first and second objects by locating the third object in a predetermined position in relation to the first connector.

The second and third connectors can be created independently from the first connector or the first connector can be used as the second or third connector.

The graphic editing apparatus in another aspect of the present invention comprises a display unit displaying a graphic including first and second objects connected with each other using a first connector, and an editing unit creating a second connector for connecting the first object and a third object, and a third connector for connecting the third object and the second object.

When the first connector is selected, for example, by a user operation, the first and second objects each connected to either end of the first connector are recognized. The editing unit creates the second and third connectors according to the recognition result. Therefore, the third object can be automatically inserted between the first and second objects by selecting the first connector.

BRIEF DESCRIPTION OF THE DRAWINGS

FIGS. 2A through 2E explain the problem of the prior art.

FIGS. 6A through 6D are examples of tables provided by the graphic editing software in the first preferred embodiment.

FIG. 8A shows the state of an updated data table.

FIG. 8B shows the state of an updated line information table.

FIGS. 9A through 9C show the state of an updated table in a process for inserting an object.

FIG. 12 is a detailed flowchart showing a process for detecting a designated line.

FIG. 19 shows an example of a graphic displayed on a monitor.

FIG. 20A shows an example of an object information table.

FIG. 20B shows an example of a line information table.

FIGS. 22A and 22B explain a process for adding a record to a table.

FIG. 24 explains a process for updating an object information table (No. 2).

FIGS. 25A and 25B explain a process for updating a line information table (No. 1).

FIGS. 28A and 28B show the state of a table after updating.

FIG. 38A shows an example of an object information table.

FIG. 38B shows an example of a line information table.

FIG. 40 is a flowchart showing the user operation procedure of the editing method in the second preferred embodiment.

FIG. 42 is a detailed flowchart showing an object insertion process.

DESCRIPTION OF THE PREFERRED EMBODIMENTS

Figure 1B:
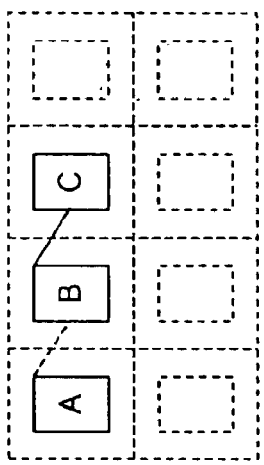
FIGS. 1A through 1F explain the procedure in the case where a new object is inserted between objects previously connected using a conventional method.
Figure 1D:
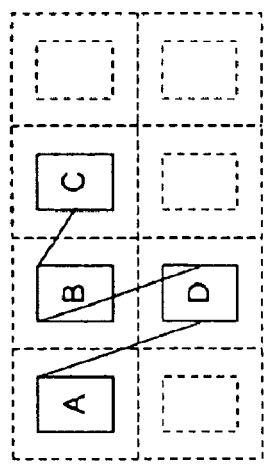
Figure 1F:
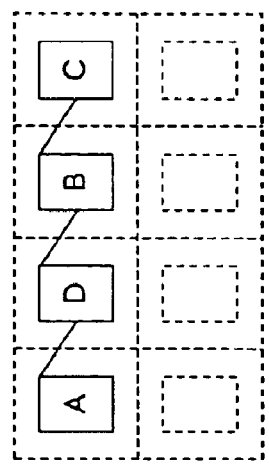
Figure 1A:
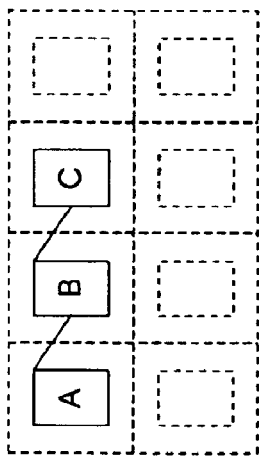
Figure 1C:
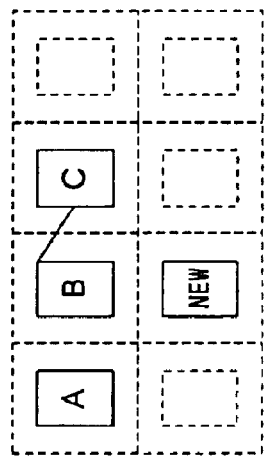
Figure 1E:
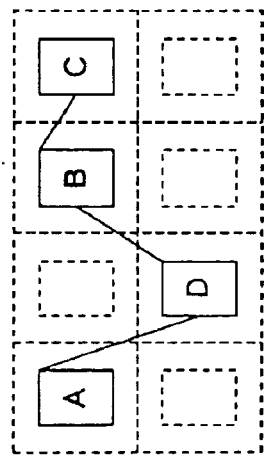
Figure 3:
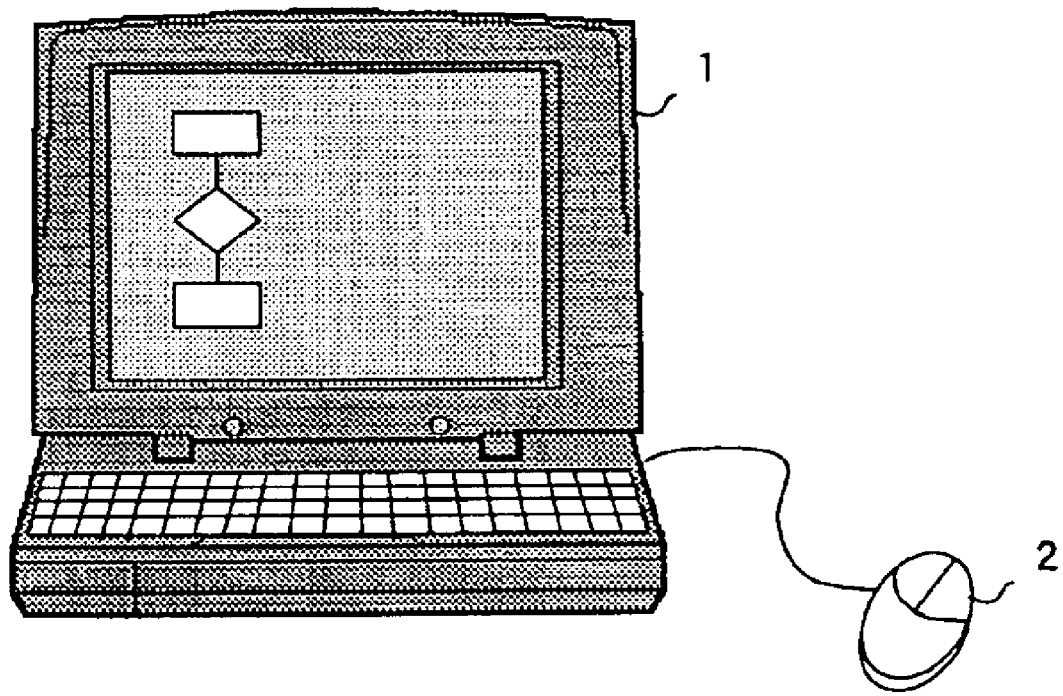
FIG. 3 explains an example of an environment for the implementation of the present invention.

The graphic editing method of the present invention relates to a method for editing a graphic, etc., displayed on the monitor of a computer 1, such as shown in FIG. 3. Although a graphic, etc., is basically edited by the user operation of a mouse 2, it can also be edited by inputting an instruction from a keyboard. For the following preferred embodiments, for example, the graphic editing method of the present invention is described below using a flowchart as its target. In a flowchart, a graphic unit corresponding to each step is handled as one "object".

The First Preferred Embodiment

FIGS. 4A through 4D explain the basic operation in the first preferred embodiment of the present invention. Here, a graphic (flowchart) where object A, object B and object C are connected in this order is displayed, and a case where a newly created object D is inserted between objects A and B is explained. It is assumed that the graphic editing software of the first preferred embodiment provides a virtual coordinate system to display objects and that each object is displayed in the box of the coordinate system.

Figure 4B:
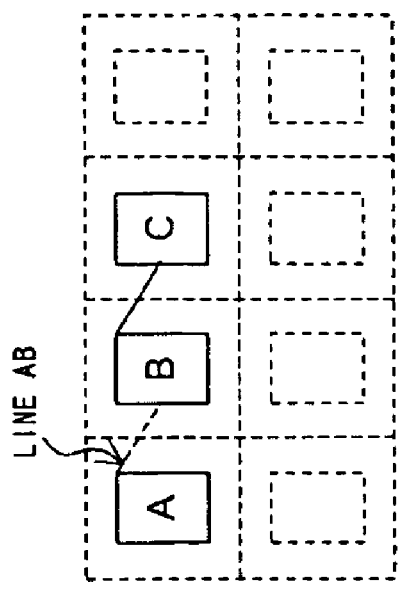
FIGS. 4A through 4D explain the basic operation in the first preferred embodiment.
Figure 4D:
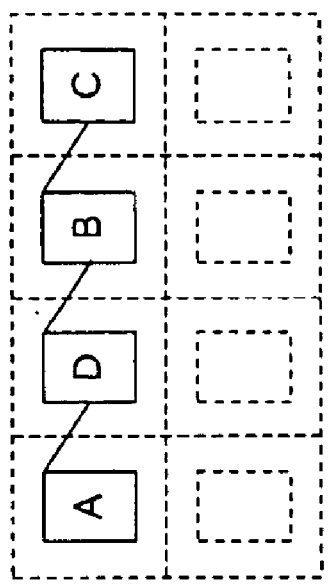
Figure 4A:
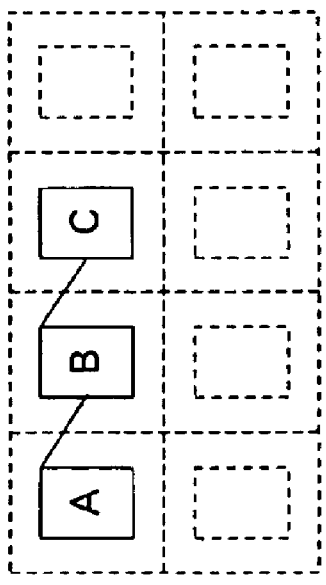

When object D is inserted between objects A and B in a state shown in FIG. 4A, a user first designates (or selects) a line AB, as shown in FIG. 4B. Since in this case, line AB starts from the upper right corner of object A, it is indicated that object A is the object preceding object B and that object B is the object following object A. A "line" is sometimes called a "connector".

A line, for example, can be designated by directly clicking on a desired line using a mouse or can be designated by way of range designation using a mouse. If a line is designated by way of range designation, a line within the designated range is designated.

Then, the user creates an object to be inserted between objects A and B. A new object is created, for example, utilizing a function provided by graphic editing software. Graphic editing software usually has a function to create a new object according to a user instruction in its menu.

Figure 4C:
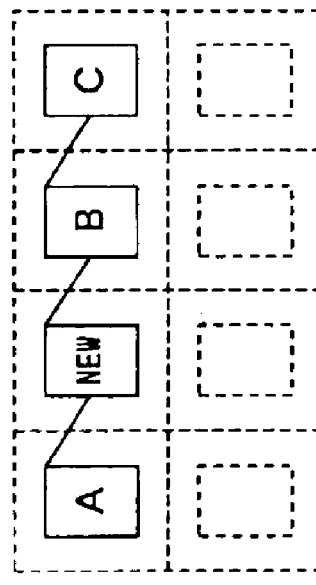

If a new object is created while line AB is designated, the new object is automatically inserted between objects A and B, as shown in FIG. 4C. At this time, line AB is deleted and simultaneously both a line connecting object A and the new object and a line connecting the new object and object B are automatically created. Thus, object A, the new object, object B and object C are connected in this order. Objects B and C are shifted in the rightward direction in FIG. 4C in such a way that the four objects, including the new object, are located in each box of the virtual coordinate system.

Then, the user sets information D in the new object. As a result, a state shown in FIG. 4D can be obtained.

In this way, according to the editing method in the first preferred embodiment, in order to insert a new object between the first and second objects connected with each other, it is sufficient if a line connecting the first and second objects is designated and an object to be inserted is created. With these operations, a connection between the objects can be automatically updated, and the re-location of each object can also be performed.

Figure 5A:
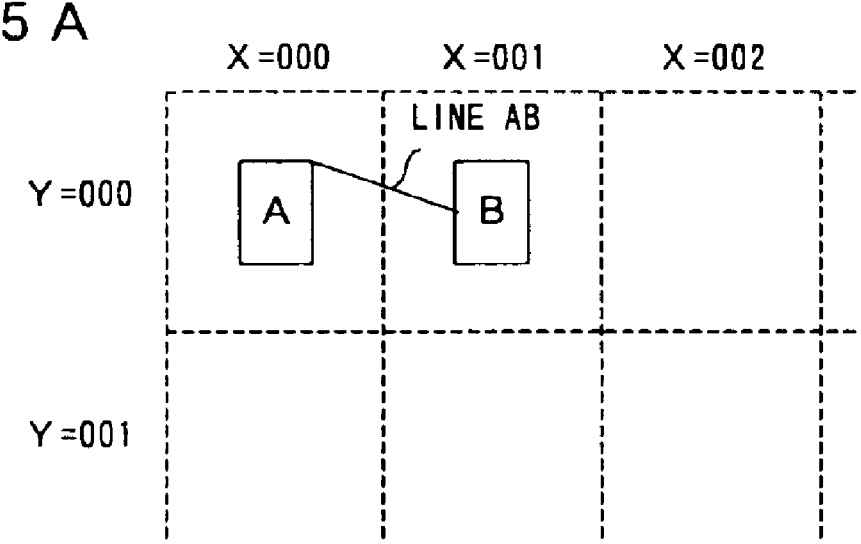
FIGS. 5A and 5B explain a graphic editing method in the first preferred embodiment.

Next, the detailed editing method in the first preferred embodiment is described. A case where a new object is inserted between objects A and B is described below. As shown in FIG. 5A, it is assumed that objects A and B are displayed at coordinates (X, Y)=(000, 000) and (X, Y)=(001, 000). Objects A and B are connected with each other using line AB.

FIGS. 6A through 6D are examples of tables provided by the graphic editing software in the first preferred embodiment. An object information table shown in FIG. 6A, a line information table shown in FIG. 6B and a data table shown in FIG. 6D indicate the display states of a graphic drawn using the graphic editing software in the first preferred embodiment. In other words, a graphic drawn using graphic editing software is displayed according to information stored in these tables. A selection index table shown in FIG. 6C is a working table, and it is used when a new object is inserted between objects previously connected.

FIG. 6A shows an example of a typical object information table. "Array 1" is an identification number for identifying a displayed object. "Display information" is information displayed in each object. "Position information" is information for calling up detailed information about each object from a data table described later. When an object is created, a corresponding record is added to the object information table, and when an object is deleted, a corresponding record is deleted from the table.

FIG. 6B shows an example of a typical line information table. "Array 2" is an identification number for identifying a line connecting displayed objects. "Front information" is information for indicating an object located at the front side of each line. "Rear information" is information for indicating an object located at the rear side of each line. Both "front information" and "rear information" indicate objects using the values of the "array 1" in the object information table.

FIG. 6C typically shows an example of a selection index table. "Array 3" is an identification number for identifying a line designated by a user when a new object is inserted between objects previously displayed. "Selection information" is information for calling up information about a line designated by a user. "Selection information" identifies a line using the value of "array 2" in the line information table.

FIG. 6D shows an example of a typical data table. "Array 4" is an identifier used to call up detailed information about each object from the object information table. "Data name is information displayed in each object. "Preceding information" is information for specifying the preceding objects of each object. "X coordinate" and "Y coordinate" are coordinates in the X and Y axes of a position in which each object is displayed, and a virtual coordinate system is used in this preferred embodiment.

The contents of the tables shown in FIGS. 6A, 6B, and 6D correspond to the display states of a graphic shown in FIG. 5A. Specifically, object A is registered in the record of "array 1=00" in the object information table shown in FIG. 6A. The detailed information of an object registered in this record is registered in the record of "array 4=31" in the data table. Therefore, (X, Y)=(000, 000) is obtained as a coordinate for displaying object A. (X, Y)=(001, 000) is obtained as a coordinate for displaying object B.

A line connecting an object registered in the record of "array 1=00" and an object registered in the record of "array 1=01" is registered in the line information table shown in FIG. 6B. In this example, objects A and B are registered in the record of "array 1=00" and the record of "array 1=01", respectively. Therefore, a line connecting objects A and B (line AB) is registered in the line information table shown in FIG. 6B. The fact that object A is the object preceding object B and that object B is the object following object A is indicated by the "front information" and "rear information" in FIG. 6B.

Figure 5B:
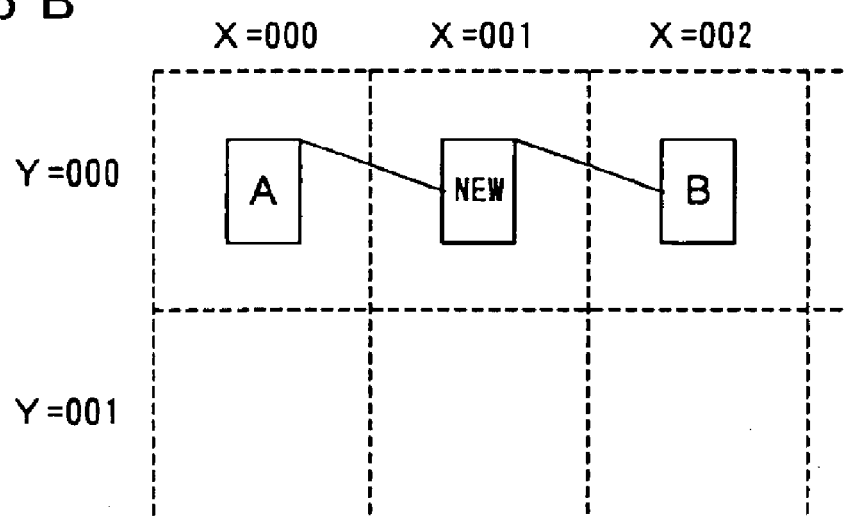

Next, a process in the case where a state shown in FIG. 5B is obtained by inserting a new object between objects A and B in a state shown in FIG. 5A, is described.

Figure 7:
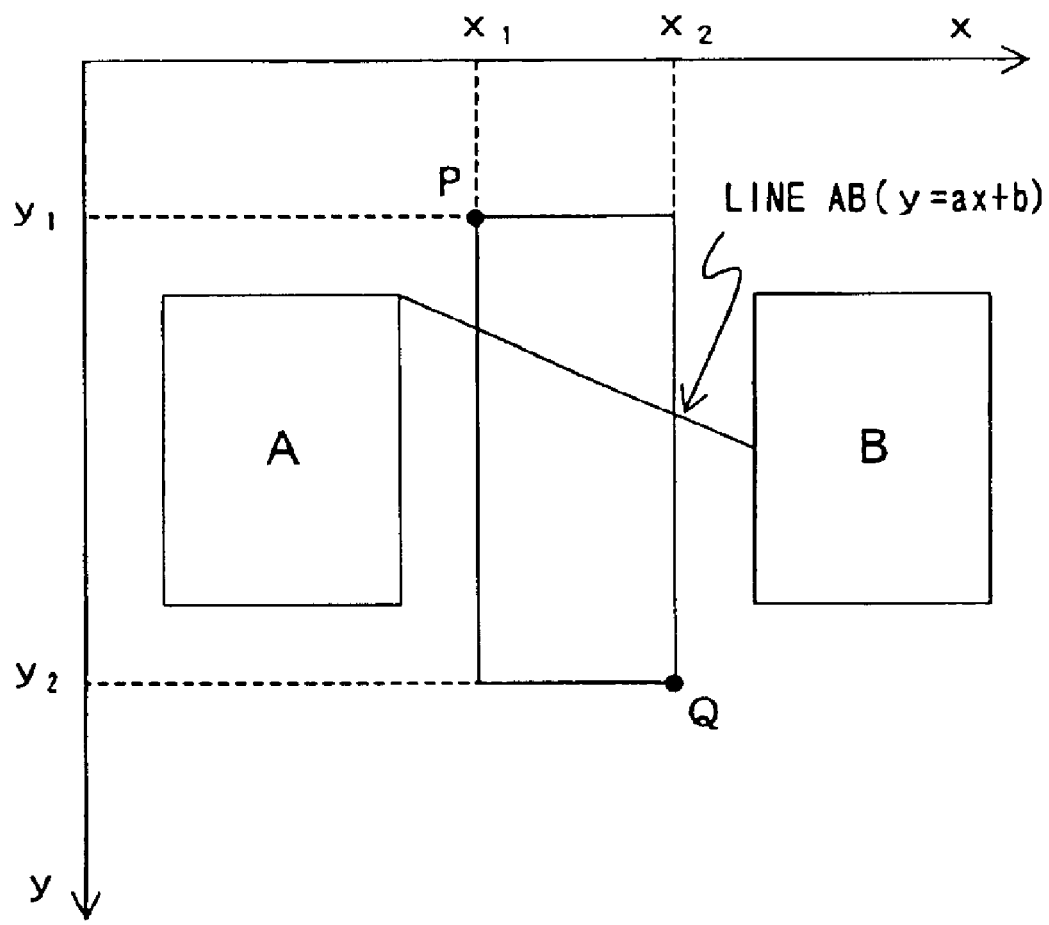
FIG. 7 explains a method for designating a line.

When a new object is inserted between objects A and B, a user first designates line AB connecting objects A and B. The designation method of a line is described with reference to FIG. 7.

A user designates a rectangle by using two desired points (points P and Q) using a mouse, etc. Four sides of this rectangle are expressed as follows.

$$x=x1 \qquad (1)$$

$$x=x2 \qquad (2)$$

$$x=y1 \qquad (3)$$

$$x=y2 \qquad (4)$$

A process for designating a rectangle by using two desired points utilizes a range designation function provided by, for example, a Windows system (Microsoft's operating system).

When the rectangle (hereinafter called a "selection range PQ") is designated, the graphic editing software checks whether there is a line passing through the selection range PQ. An equation specifying each line, for example, can be calculated when a user inputs a selection range PQ, or it can be registered in the line information table in advance as additional information. The equation of each line is generally expressed as follows.

$$y=ax+b \qquad (5)$$

The graphic editing software checks whether there is any intersection point at which each line registered in the line information table and each of the straight lines indicated by equations (1) through (4) intersect. If there is the intersection point, it is checked weather the value in the y coordinate of the intersection point is located between the value (y1) in the y coordinate of point P and the value (y2) in the y coordinate of point Q. If so, the line is considered to pass through the selection range PQ, and the line is registered in the selection index table. Therefore, in an example shown i FIG. 7, line AB is registered in the selection index table. A selection index table shown in FIG. 6C indicates a state in the case where line AB is designated in the state shown in FIG. 5A.

In this way, the graphic editing software detects a line which passes through the selection range and registers the detected line in the selection index table, when the selection range PQ is input by a user.

Then, the user inputs an instruction to create an object to be inserted between objects A and B. When this instruction is inputted, the graphic editing software adds a record corresponding to the object to be newly created, to both the object information table and the data table. In the example shown in FIG. 6, "array 1=02" and "array 4=32" are added to the object information table and the data table, respectively.

Then, the graphic editing software updates the tables in such a way that a newly created object is displayed in the position where object B is being displayed. First the graphic editing software acquires the display position of object B according the following procedure.

(1) "Selection information=10" in selection index table
(2) "Rear information=01" of "array 2=10" in line information table
(3) "Position information=30" of "array 1=01" in object information table
(4) "X coordinate" and "Y coordinate" of "array 4=30" in data table Both "X coordinate=001" and "Y coordinate=000" are obtained according to this procedure. Then, the obtained "X coordinate" and "Y coordinate" are written in the record of "array 4=32" in the data table. As a result, the data table is updated to a state shown in FIG. 8A.

Then, the graphic editing software extracts from the data table a record in which the value of "X coordinate" is greater than the value of "x coordinate" in a record newly registered in "array 4=32" and in which the value of "Y coordinate" is the same as the value of "Y coordinate" in the record in "array 4=32". Then, "1" is added to the value of "X coordinate" in each extracted record. However, in the example shown in FIGS. 5A and 5B, such a record is not extracted.

Then, the graphic editing software updates the tables to reset a line which connects objects. Specifically, first the software adds a record (array 2=11) for a line to be newly created, to the line information table. Then, the software accesses the line information table using the "selection information (=10)" of a line registered in the selection index table as a key, and it writes the rear information (=01)" of a record obtained by the access process, in the line information table as the "rear information" of the newly added record. The software also writes the "array 1 (=02)" of the newly added record in the object information table as the "rear information" of a record to be obtained by the access process. Further, the software writes the "array 1 (=02)" of the record newly added to the object information table as the "front information" of the record newly added to the object information table. By the process, the line information table enters a state shown in FIG. 8B.

Then, the tables are updated to shift object B in the rightward direction. The coordinate of object B is acquired according to the following procedure.

(1) "Rear information=01" of "array 2=11" in line information table
(2) "Position information=30" of "array 1=01" in object information table
(3) "X coordinate" and "Y coordinate" of "array 4=30" in data table Both "X coordinate=001" and "Y coordinate=000" are obtained according to this procedure, Then, "1" is added to the obtained "X coordinate".

As a result of the above mentioned process, the object information table, line information table and data table enter states shown in FIGS. 9A, 9B, and 9C, respectively. Then, the graphic shown in FIG. 5B is obtained by displaying data according to these tables. The selection index table is deleted when the process has been completed.

Figure 10:
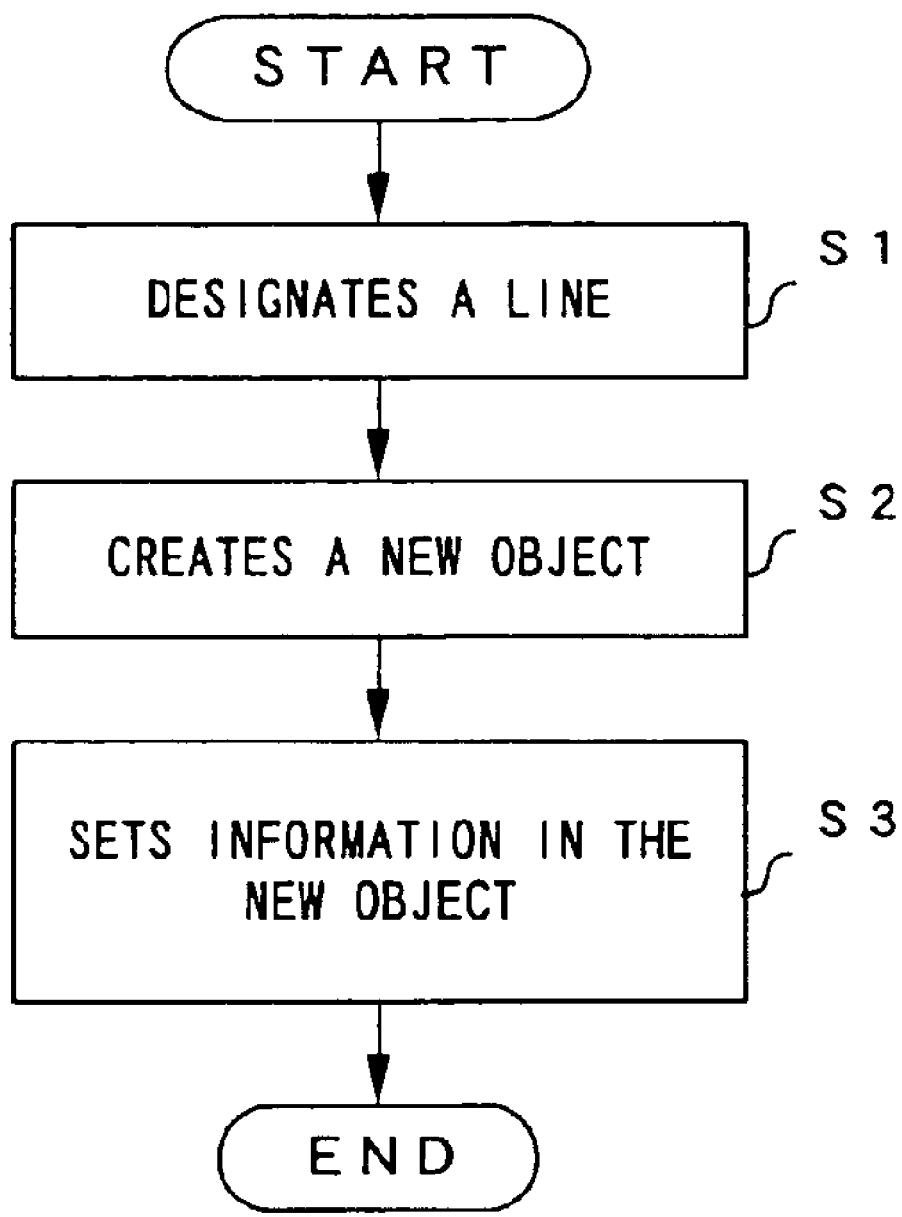
FIG. 10 is a flowchart showing a user operation in the first preferred embodiment.

FIG. 10 is a flowchart showing a user operation in a process for inserting a new object between objects in the first preferred embodiment. In step S1, a user designates (or selects) a line which connects objects. In step S2, the user creates a new object. The line designation method and object creation method are the same as those described above. In step S3, desired information is set in the new object created in step S2. This is performed by the input of a character string, etc., using a keyboard or by pasting data prepared in advance.

Figure 11:
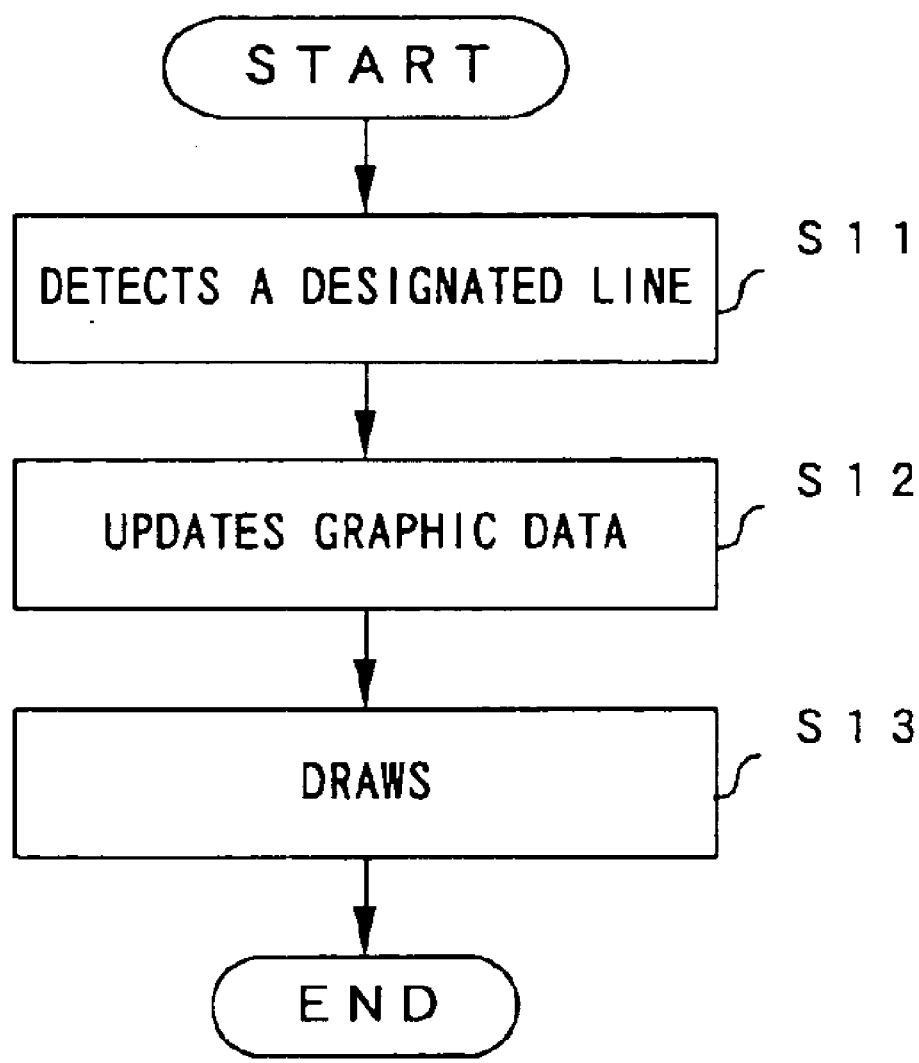
FIG. 11 is a flowchart showing the outline of the operation of graphic editing software in the first preferred embodiment.

FIG. 11 is a rough flowchart showing the operation of the graphic editing software in the first preferred embodiment. A process in this flowchart is executed when the user designates a line.

In step S11, the line designated by the user is detected. In step S12, graphic data are updated. Graphic data at least include information registered in the tables shown in FIG. 6. Step S12 is executed when the user inputs an instruction to create a new object. In step S13, a graphic is displayed according to the graphic data updated in step S12.

FIG. 12 is a detailed flowchart showing the "detection of a line", and it corresponds to a process in step S11 shown in FIG. 11. A process in this flowchart is executed in order for each line registered in the line information table. That is to say, this process is executed for each displayed line.

In step S21, a line registered in the line information table is acquired, and an equation indicating the line is obtained. The equation of the line can be easily obtained using the prior art.

In step S22, it is checked whether the line acquired in step S21 passes through a selection range inputted by the user. A method used for this judgment is as described with reference to FIG. 7. If the line passes through the selection range, a process in step S23 is executed, and if it does not, step S23 is skipped.

In step S23, a line passing through the selection range is registered in the selection index table. Specifically, a new record is added to the selection index table, and the value "array 2" corresponding to the line acquired in step S21 is written therein as the "selection information" of the newly added record. Step S24 is for returning to step S21 and acquiring the next line when there remains an unprocessed line in the line information table.

By the above-described process, the line designated by the user is registered in the selection index table. If the user designates a plurality of lines, the plurality of designated lines are registered in the selection index table.

Figure 13:
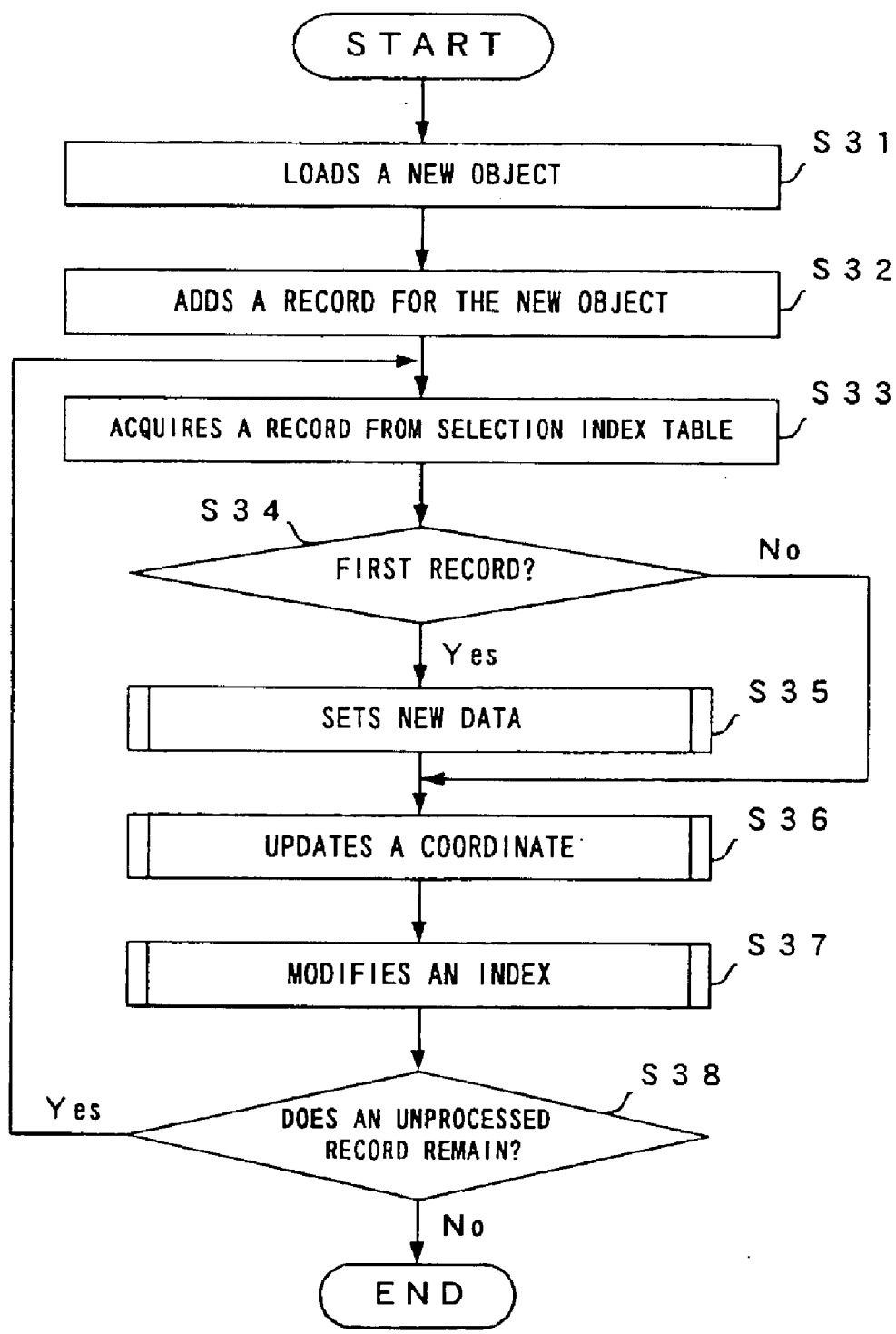
FIG. 13 is a flowchart showing a process for updating graphic data.

FIG. 13 is a detailed flowchart showing the "updating of graphic data", and it corresponds to the process in step S12 shown in FIG. 11. A process in this flowchart is executed in order for each record registered in the selection index table. That is to say, this process is executed for each line designated by the user.

In step 31, data for drawing an object which is to be newly created by a user instruction are loaded in the prescribed area of a memory. In step S32, a record for the new object is added to both the object information table and data table. In step S33, a record is extracted from the selection index table.

In step S34, it is checked whether the record extracted in step S33 is the first record in the selection index table. If it is, the process in step S35 is executed, and if it is not, step S35 is skipped.

In step S35, a coordinate is set to display the new object. In step S36, the coordinate of an object with a display position that is modified by the insertion of the new object, is updated. In step S37, information about a line with a connection relationship that is changed by the insertion of the new object, is updated. Each of the processes in steps S35 through S37 is described later in detail. Step S38 is for returning to step S33 and acquiring the next record when there remains an unprocessed record in the selection index table.

By the above-described process, data are set to display the new object. The coordinate of the display position of objects connected at the rear end of a line designated by the user, are updated. Further, a line connecting objects is reset.

Figure 14:
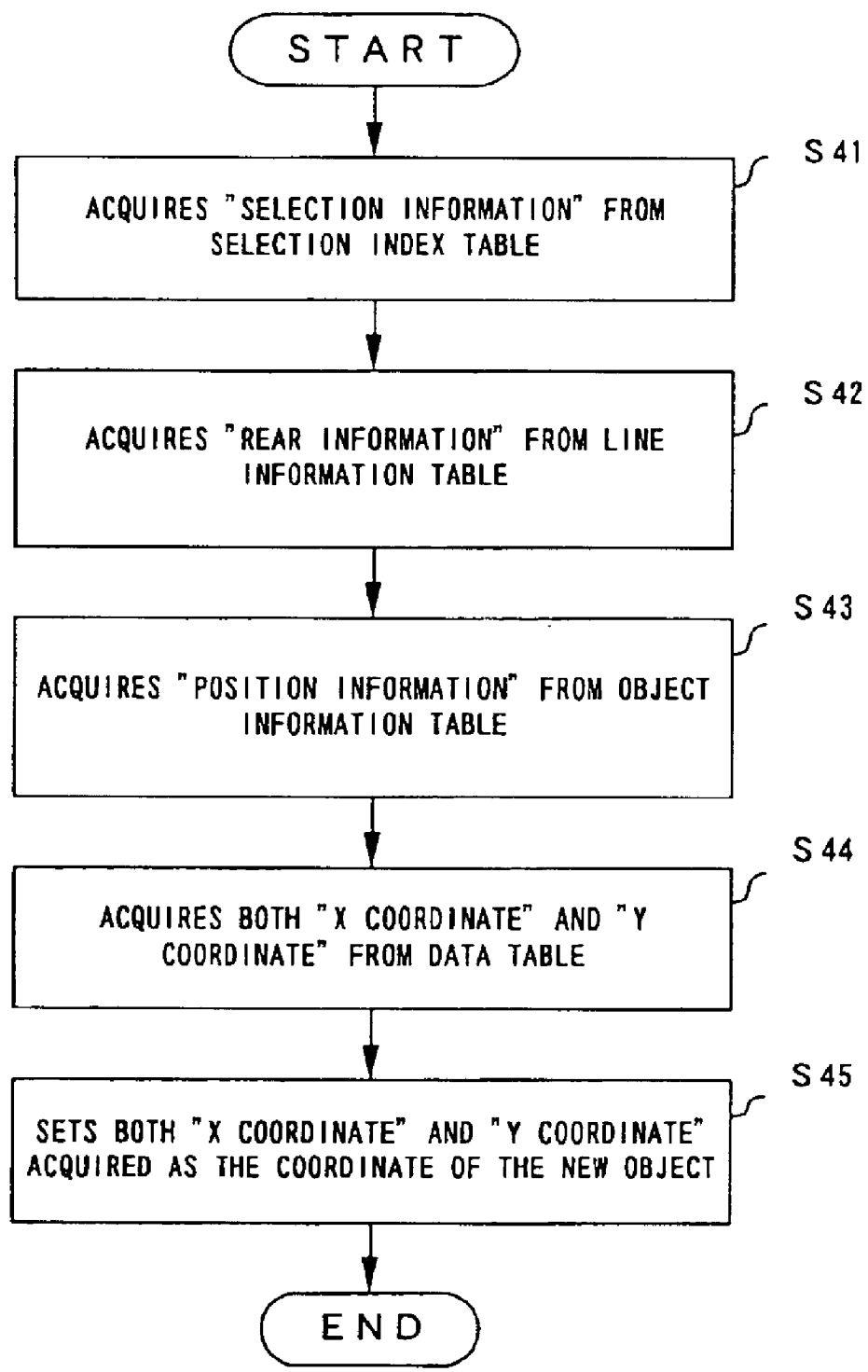
FIG. 14 is a detailed flowchart showing a process for setting a coordinate to display a new object.

FIG. 14 is a detailed flowchart showing a process for setting a coordinate to display a new object, and it corresponds to the process in step S35 shown in FIG. 13. A process in the flowchart shown in FIG. 14 is executed only for the first record in the selection index table.

In step S41, the "selection information" of the first record in the selection index table is extracted. In step S42, the line information table is accessed using the "selection information" extracted in step S41 as a key, and "rear information" is extracted. In step S43, the object information table is accessed using the "rear information" extracted in step S42 as a key, and "position information" is extracted. In step S44, the data table is accessed using the "position information" extracted in step S43 as a key, and both "X coordinate" and "Y coordinate" are extracted. In step S45, both "X coordinate" and "Y coordinate" extracted in step S44 are set in the data table as "X coordinate" and "Y coordinate", respectively, of the new object.

Figure 15:
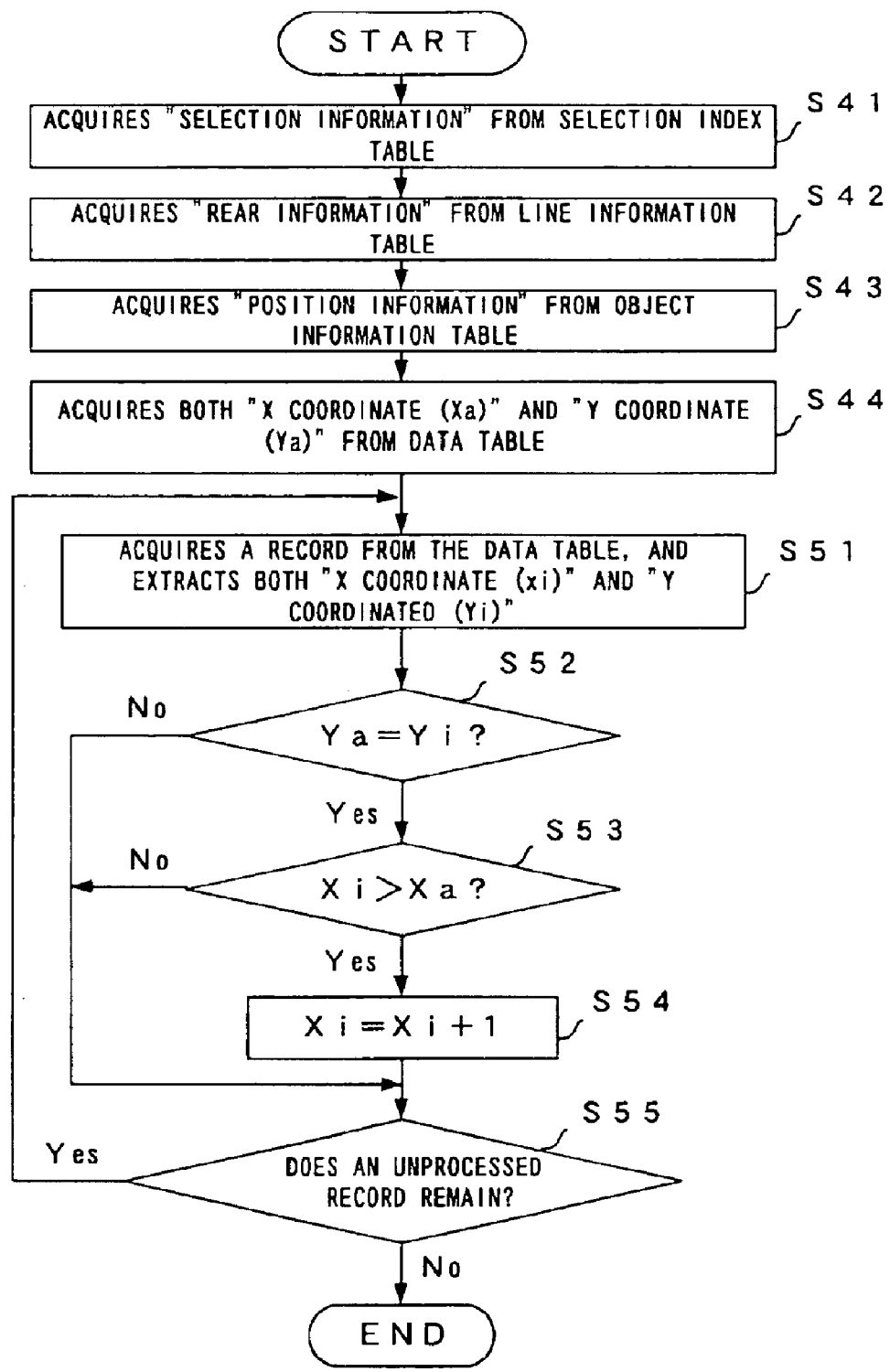
FIG. 15 is a detailed flowchart showing a process for modifying a coordinate to display objects previously displayed.

FIG. 15 is a detailed flowchart showing a process for modifying a coordinate to display objects previously displayed, and it corresponds to the process in step S36 shown in FIG. 13. A process in the flowchart shown in FIG. 15 is executed for each record registered in the selection index table.

Steps S41 through S44 are as described with reference to FIG. 14. However, in the description of the flowchart shown in FIG. 15, it is assumed that the "X coordinate" and "Y coordinate" obtained by the processes in steps S41 through S44 are called "Xa" and "Ya", respectively.

A process in steps S51 through S54 is executed for each record in the data table. In step S51, a record is acquired from the data table, and both "X coordinate" and "Y coordinate" are extracted from the record. It is assumed that "X coordinate" and "Y coordinate" extracted in step S51 are called "Xi" and "Yi", respectively.

In step S52, it is checked whether "Y coordinate (Ya)", extracted in step S44, and "Y coordinate (Yi)", extracted in step S51, are the same. If they are, step S53 is executed, and if they are not, steps S53 and S54 are skipped. In step S53, it is checked whether "X coordinate (Xi)", extracted in step S51, is greater than "X coordinate (Xa)", extracted in step S44. If "X coordinate (Xi)" is greater than "X coordinate (Xa)", step S54 is executed, and if not, step S54 is skipped.

In step S54, "1" is added to "X coordinate (Xi)", extracted in step S51. Step S55 is for returning to step S51 and acquiring the next record when there remains an unprocessed record in the data table.

By the above-described process, X coordinate is modified to display objects connected at the rear end of a line selected by the user. As a result, when a graphic is drawn according to this updated data table, the display positions of those objects are shifted in the X direction.

Figure 16:
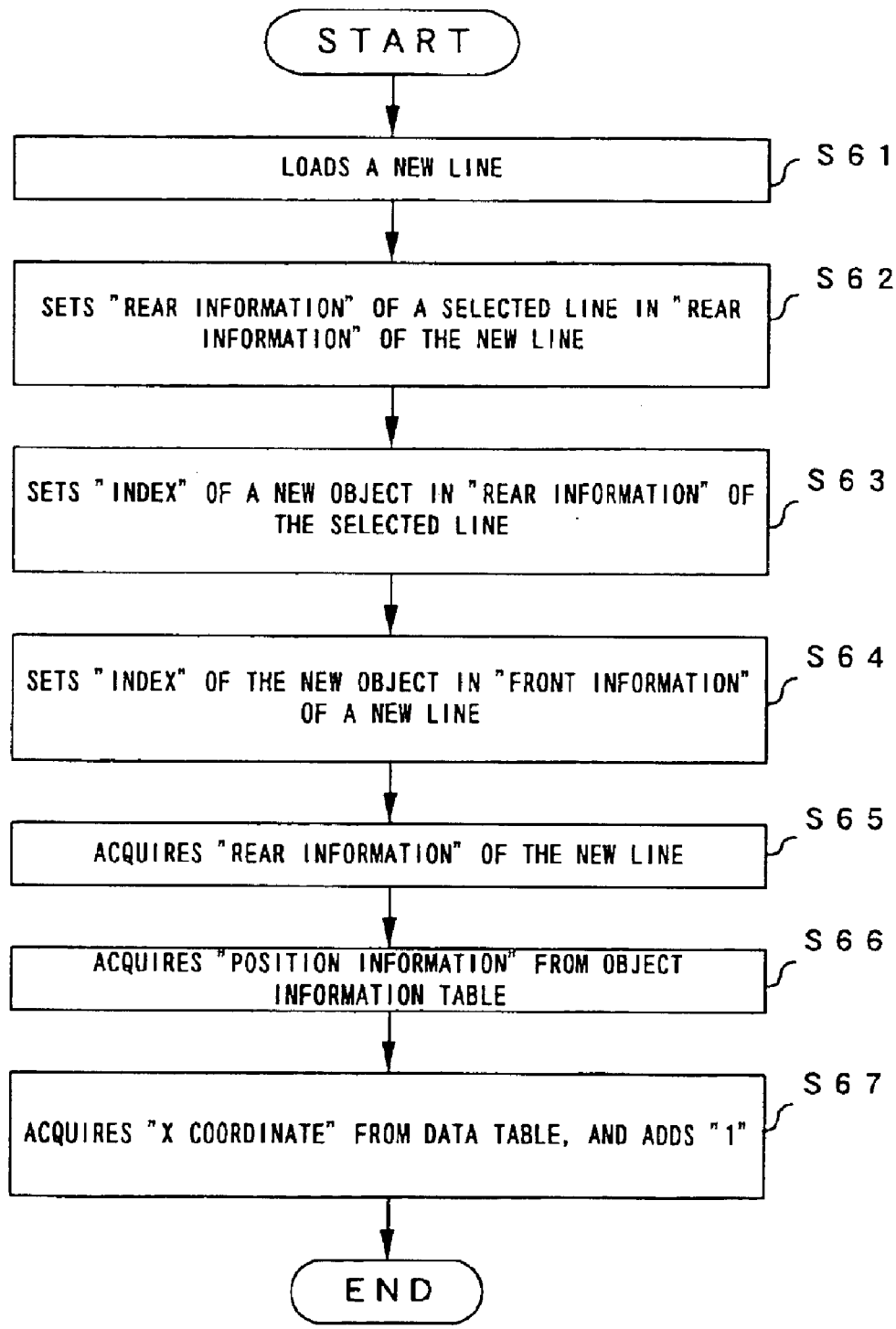
FIG. 16 is a detailed flowchart showing a process for updating a line information table.

FIG. 16 is a detailed flowchart showing a process for updating the setting of a line with a connection relationship that is modified, and it corresponds to the process in step S37 shown in FIG. 13. A process in the flowchart shown in FIG. 16 is executed for each record registered in the selection index table.

Figure 17A:
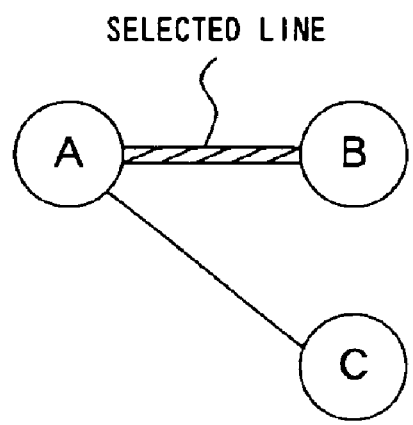
FIGS. 17A and 17B are reference drawings used to explain the flowchart shown in FIG. 16.
Figure 17B:
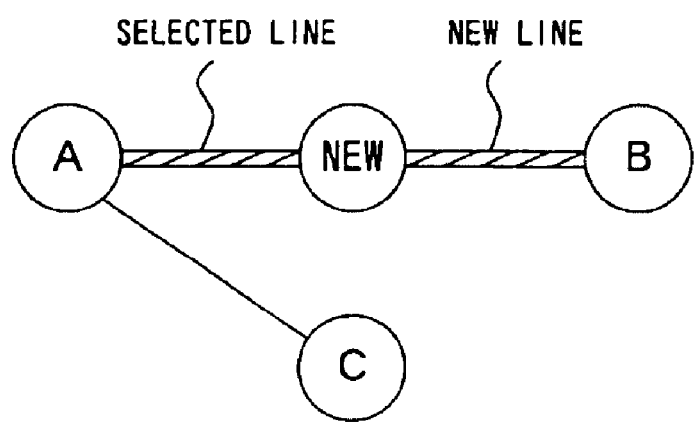

In the description of the flowchart shown in FIG. 16, the example shown in FIGS. 17A and 17B are used. In this example, line AB is selected in a state shown in FIG. 17A, and a new object is inserted between objects A and B. As a result, a display state shown in FIG. 17B is obtained. In this case, the "rear information" of the selected line is changed from "object B" to "new object". "New object" and "object B" are set as the "front information" and "rear information", respectively, of the new line. Further, the display position of object B is shifted in the rightward (X) direction.

In step S61, data for displaying the new line are loaded in the prescribed area of a memory. At this time, a record for the new line is added to the line information table.

In step S62, the "rear information" of the selected line is set as the "rear information" of the new line. For example, in FIG. 17A, "object B" is connected at the rear end of the selected line. Therefore, in this case, "object B" is set as the "rear information" of the new line.

In step S63, the index of the new object is set as the "rear information" of the selected line. In step S64, the index of the new object is set as the "front information" of the new line. "Index" is, for example, an identification number for identifying an object, and corresponds to "array 1" of the object information table.

Steps S65 through S67 are for shifting in the X direction an object existing in the position where a new object should be displayed. Specifically, in the example shown in FIG. 17A, steps S65 through S67 are for shifting object B in the rightward direction.

In step S65, the "rear information" of the new line is extracted from the line information table. In step S66, the object information table is accessed using the "rear information" extracted in step S65 as a key, and a corresponding "position information" is extracted. In step S67, the data table is accessed using the "position information" extracted in step S66 as a key, and "X coordinate" is extracted. Then, "1" is added to the extracted "X coordinate".

Figure 18A:
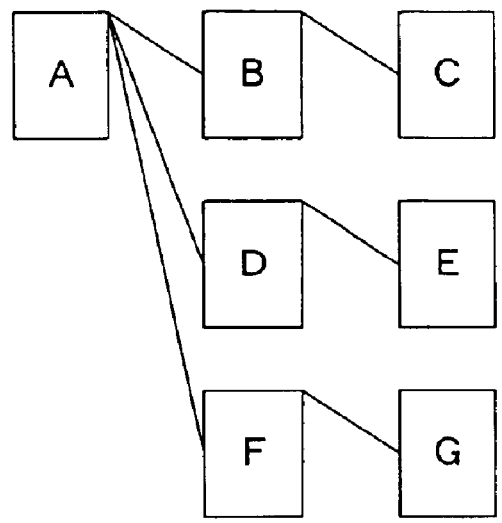
FIGS. 18A and 18B explains another concrete example of the editing method in the first preferred embodiment.
Figure 18B:
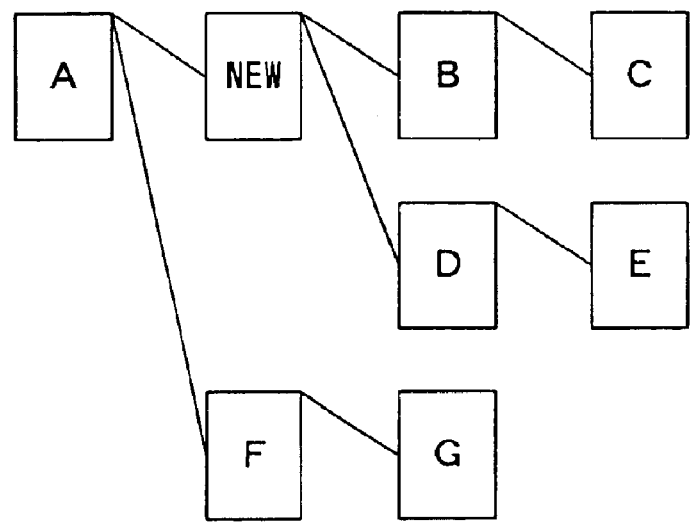

Next, another concrete example of the editing method in the first preferred embodiment is described. An editing method in the case where a state shown in FIG. 18B is obtained by inserting a new object between objects A and B and simultaneously between objects A and D in a state shown in FIG. 18A, is described below.

FIG. 19 explains a display method for displaying a graphic on a monitor. Here, the graphic shown in FIG. 18A is displayed. In this preferred embodiment, a virtual coordinate system is used. Specifically, the display positions of all objects composing a graphic are given in terms of a virtual coordinate. For example, the display position of object A is given as (X, Y)=(0, 0) in the virtual coordinate system.

FIG. 20A shows an example of the object information table. The object information table stores information about displayed objects. The object information table shown in FIG. 20A indicates the display state shown in FIG. 19. Specifically, object numbers "1" through "7" are assigned to objects A through G, respectively. The object information table also stores the coordinates of the display positions of objects. "Array 1 (index)" is a number for specifying each record in the object information table, while "object number" is a number for identifying each displayed object. Therefore, both the numbers are not always are the same.

FIG. 20B shows an example of the line information table. The line information table stores information about displayed lines. A line information table shown in FIG. 20B indicates the display state shown in FIG. 19. Specifically, "1" through "6" are assigned to the displayed lines as line numbers (connecting line numbers), respectively. The line information table also stores both "front information" for specifying objects connected at the front end of a line and "rear information" for specifying objects at the rear end of a line. "Array 2 (index)" is a number for specifying each record in the line information table, while "line number" is a number for identifying each displayed line. Therefore, both the numbers are not always are the same.

When inserting a new object both between objects A and B and between objects A and D in the state shown in FIG. 19, a user selects both a line connecting objects A and B, and a line connecting objects A and D by way of range designation using a mouse, etc. Specifically, lines 1 and 3 are selected.

Figures 21A, 21B:
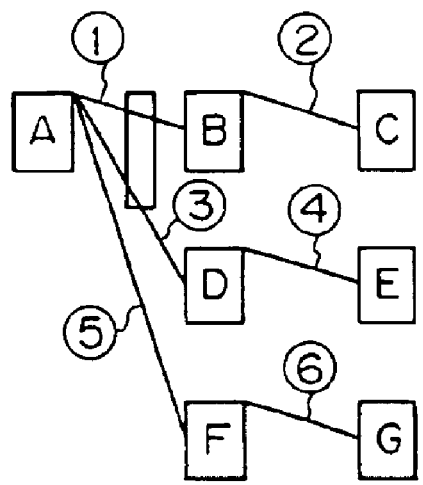
FIG. 21A explains a method for selecting a line.
FIG. 21B shows an example of a selection index table.

The graphic editing software detects the lines selected by the user. A method for detecting the lines is as described above with reference to FIG. 7. Then, the lines selected by the user are registered in the selection index table shown in FIG. 21B. "Registration position" registered in the selection index table is an "index (array 2)" used for extracting information about the relevant line from the line information table.

Then, the user creates a new object to be inserted in the above-described position. When receiving an instruction to create the new object, the graphic editing software first loads both data used to draw a new object and data used to draw lines newly required to insert the new object, in a prescribed area in a memory. Then, as shown in FIG. 22A, a record for the new object is added to the object information table. As shown in FIG. 22B, a record for the new line is also added to the line information table.

The graphic editing software performs the following process for a line registered in the first record of the selection index table.

Figure 23:
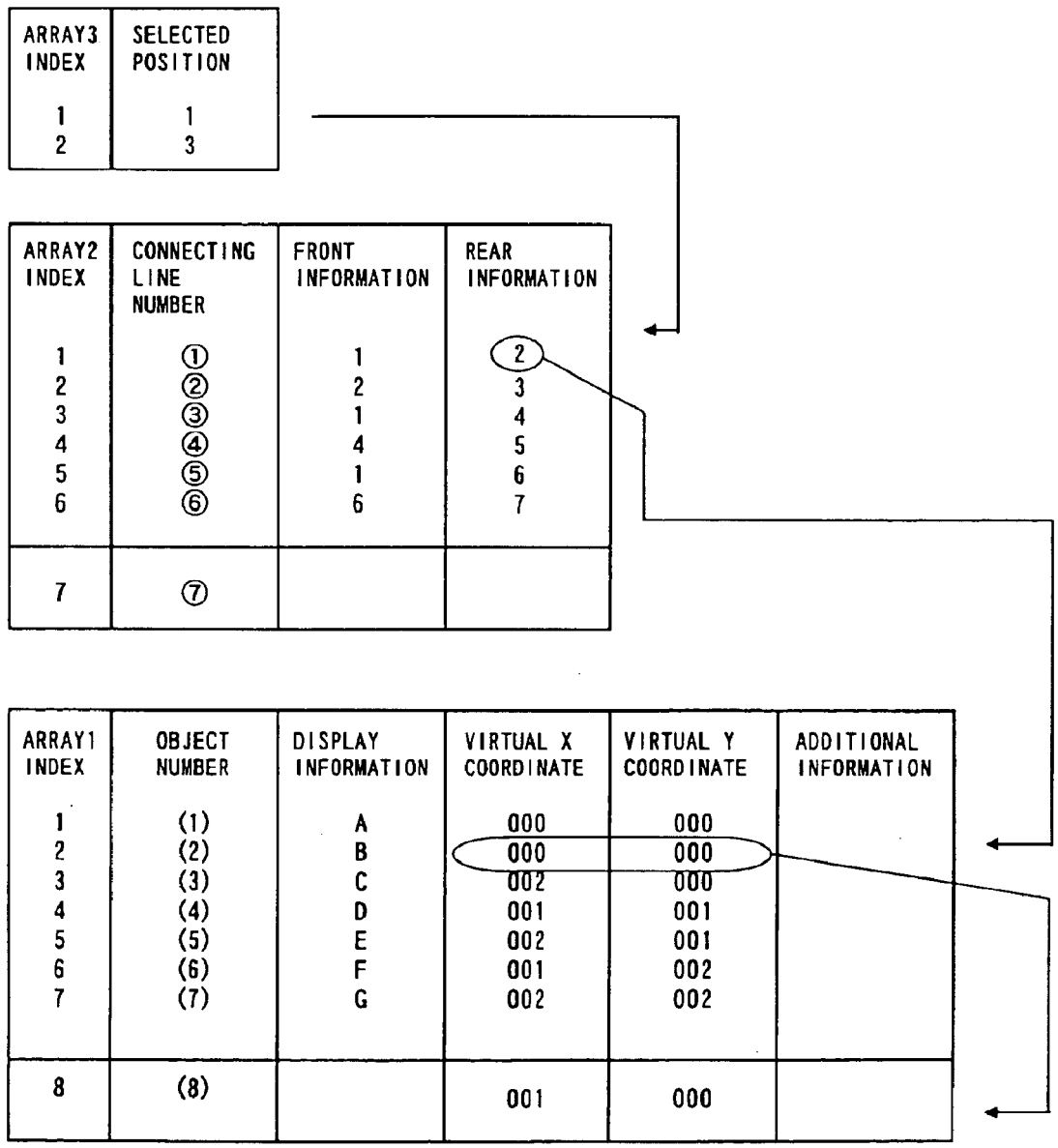
FIG. 23 explains a process for updating an object information table (No. 1).

First, as shown in FIG. 23, "selection position" is extracted from the first record of the selection index table, and the line information table is accessed using the "selection position" as a key. "Selection position" indicates the "index" of the line information table. Therefore, information about line 1 is obtained by the access. Then, the "rear information" of line 1 is extracted, and the object information table is accessed using the "rear information" as a key. "Rear information" indicates the "index" of the object information table. Thus, information about object B is obtained by this access. Then, both "X coordinate" and "Y coordinate" of object B are extracted and are written in the record of the new object.

By the above-described process, the coordinate on which object B is being displayed is obtained as a coordinate for the new object.

Then, as shown in FIG. 24, "1" is added to "X coordinate" of object B and "X coordinate" of object C. Objects B and C are objects connected to the rear side of line 1 (the right side of line 1 in FIG. 19) selected by the user.

Specifically, this addition process first extracts both "X coordinate" and "Y coordinate" of an object which are specified as "rear information" of line 1 stored in the line information table, from the object information table. In this example, (X, Y)=(001, 000) is obtained as the coordinate of object B. Then, a record in which both "X coordinate≧001" and "Y coordinate=000" are satisfied, is searched for in the object information table, and "1" is added to the "X coordinate" of the extracted record. As a result, the coordinate of object B is updated to (X, Y)=(002, 000), and the coordinate of object C is updated to (X, Y)=(003, 000). The record for the new object is excluded from the search targets.

By the above-described process, coordinates representing objects B and C are updated sequentially.

After this addition process, an index indicating a record for the new object in the object information table is written in the line information table as "rear information" of the new line. Specifically, an index indicating the new object is set as "rear information" of the new line.

Then, as shown in FIG. 25A, "front information" is extracted from a record in the line information table designated by "selection position" of the first record in the selection index table, and is written in "front information" of the new line. Specifically, "1", which is "front information" of line 1, is written in "front information" of the new line in the line information table.

Further, as shown in FIG. 25B, "rear information" of the new line is written as "front information" of a record in the line information table which is designated by "selection position" of the first record in the selection index table. Specifically, "8", which is "rear information" of the new line, is written in "front information" of line 1 in the line information table.

By the above-described process, both information indicating that object A is connected to the front end of the new line and information indicating that a new object is connected to the front end of line 1 selected by the user are registered in the line information table.

Then, the graphic editing software performs the following process for lines registered in the second and subsequent records of the selection index table. A process for the second record is described here.

Figure 26:
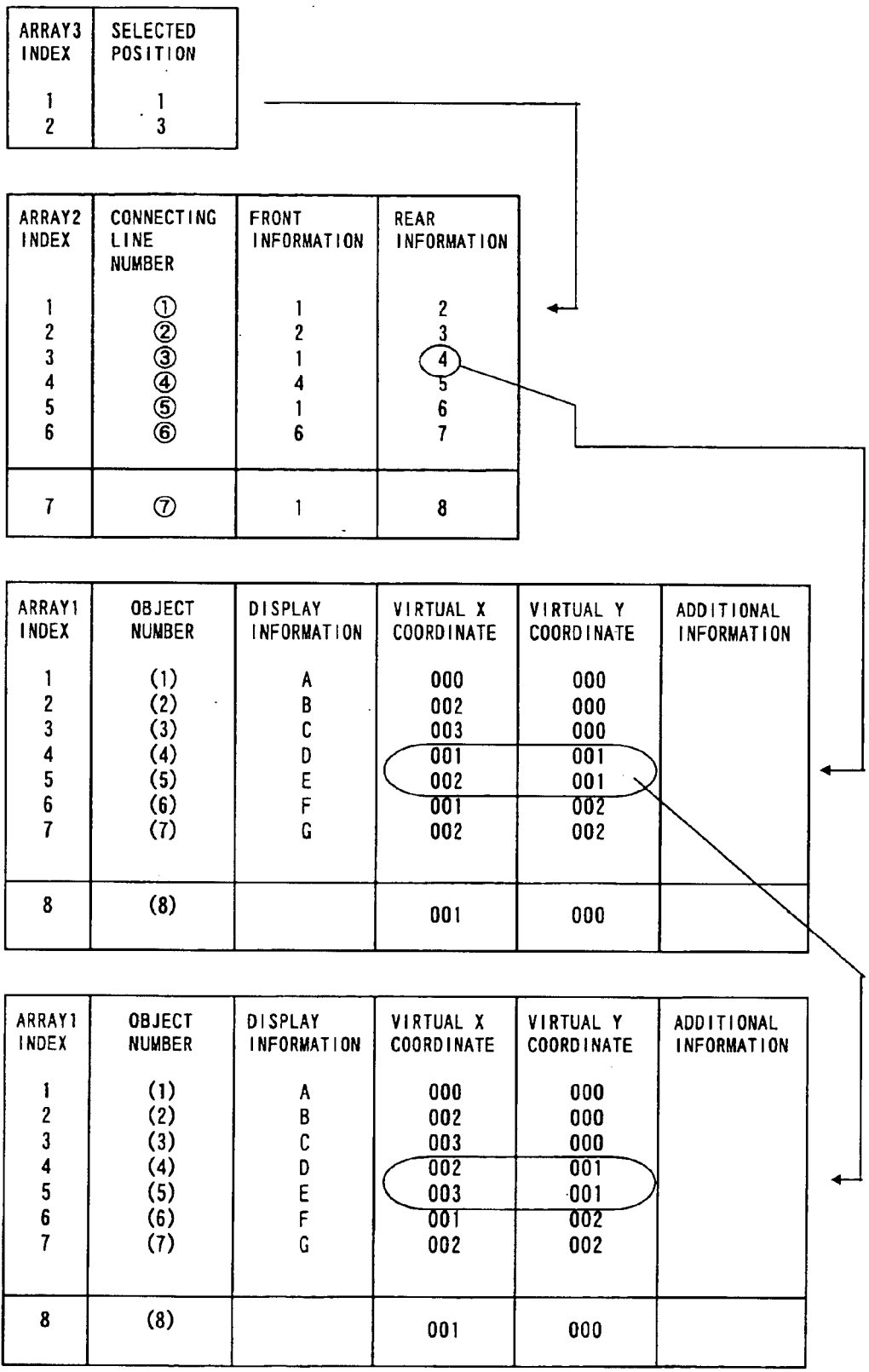
FIG. 26 explains a process for updating an object information table (No. 3).

First, as shown in FIG. 26, "selection position" is extracted from the second record in the selection index table, and the line information table is accessed using the "selection position" as a key. With this access process, information about line 3 is obtained. Then, "rear information" of line 3 is extracted from the line information table, and the object information table is accessed using the "rear information" as a key. With this access process, information about object D is obtained. Then, "1" is added to both "X coordinate" of object D and "X coordinate" of object E. Objects D and E are objects connected to the rear side of line 3 selected by the user.

This addition process is basically the same as the procedure described with reference to FIG. 24. Specifically, first, both "X coordinate" and "Y coordinate" of an object which are specified as "rear information" of line 3 stored in the line information table, are extracted from the object information table. In this example, (X, Y)=(001, 001) is obtained as the coordinate of object D. Then, a record in which both "X coordinate ≧001" and "Y coordinate=001" are satisfied, is searched for in the object information table, and "1" is added to "X coordinate" of the extracted record. As a result, the coordinates of objects D and E are modified to (X, Y)=(002, 001) and (X, Y)=(003, 001), respectively. The record for the new object is excluded from the search targets.

Figure 27:
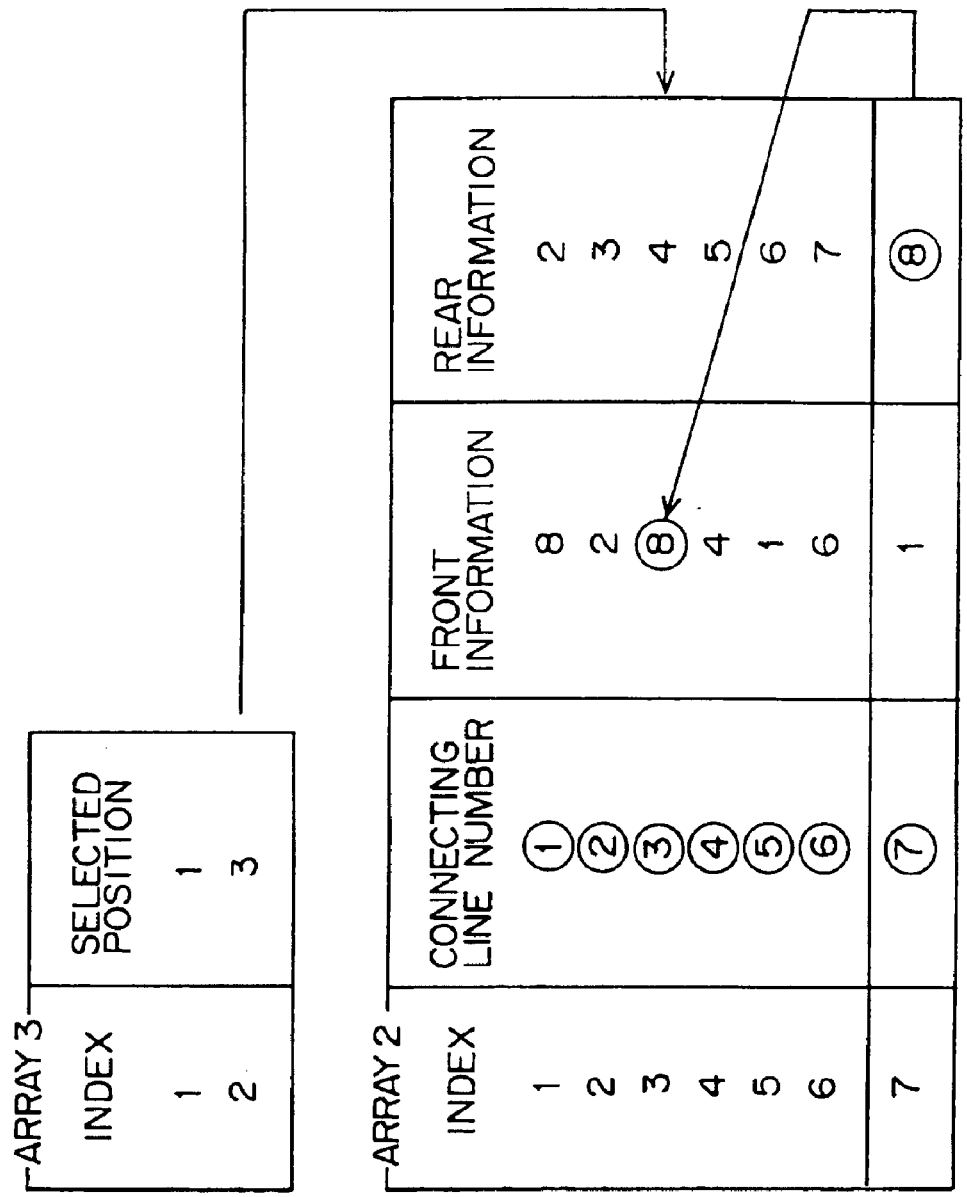
FIG. 27 explains a process for updating a line information table (No. 2).

Further, as shown in FIG. 27, "rear information" of the new line is written as "front information" of a record in the line information table which is designated by "selection position" of the second record in the selection index table. Specifically, in the line information table, "8", which is "rear information" of the new line, is written in "front information" of line 3.

With the process described above with reference to FIGS. 22 through 27, the object information table and the line information table are updated to the states shown in FIGS. 28A and 28B, respectively. The selection index table is deleted when the above-described process has been completed.

Figure 29:
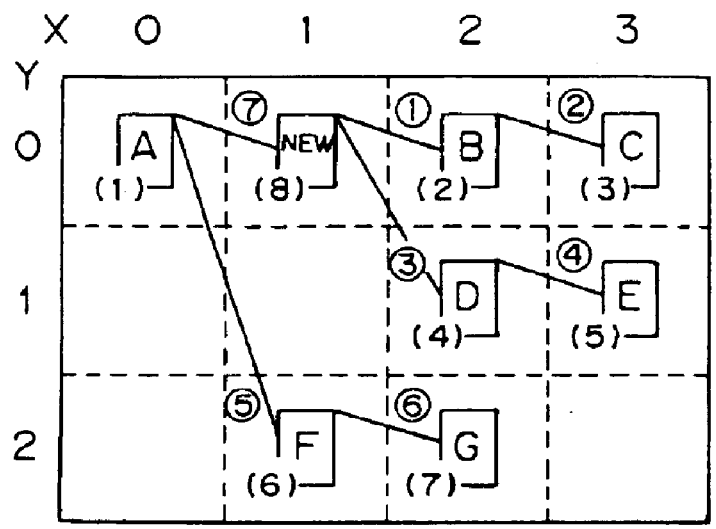
FIG. 29 shows a graphic drawn according to a table after it has been updated as shown in FIGS. 28A and 28B.

FIG. 29 shows a graphic drawn according to a table after the updates shown in FIGS. 28A and 28B have been made.

Since the first record in the object information table is not updated, object A is displayed at the (X, Y)=(001, 000). The new object is displayed at the (X, Y)=(001, 000) according to information stored in the eighth record of the object information table. A new line connecting object A and the new object is displayed according to information stored in the seventh record in the line information table.

Since "X coordinate", corresponding to objects B through E in the object information table, is increased by "1", objects B through E are displayed in a position shifted "1" in the rightward direction, with reference to the state shown in FIG. 19. Since "front information" of lines 1 and 3 both are modified from "1" to "8" in the line information table, line 1 is displayed so as to connect the new object and object B, and line 3 is displayed so as to connect the new object and object D. As a result, the graphic shown in FIG. 18B is obtained.

Figure 30:
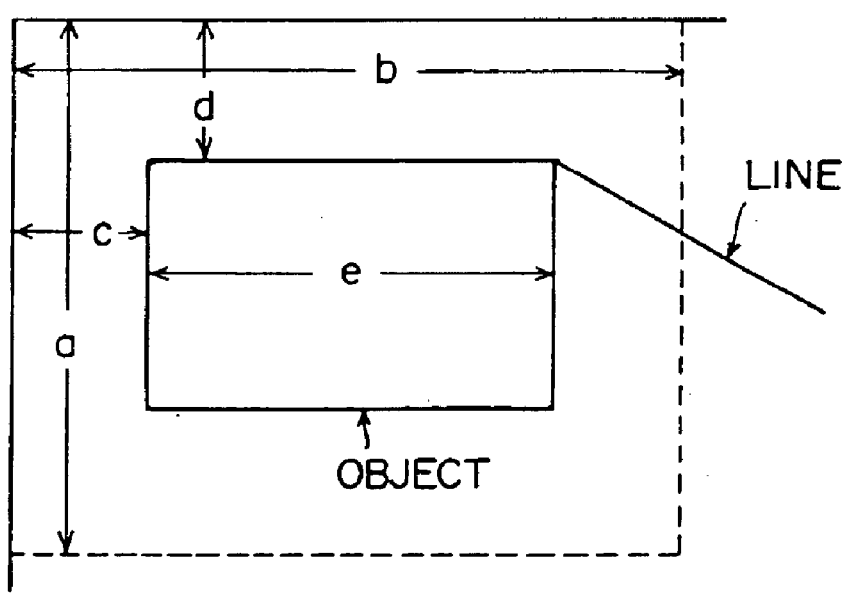
FIG. 30 explains the relationship between an absolute coordinate system on a monitor and a virtual coordinate system used by graphic editing software.

FIG. 30 explains the conversion relationship between an absolute coordinate system on a monitor and a virtual coordinate system used by the graphic editing software. Here, "height of each box" and "width of each box" of the virtual coordinate system are converted to "a" and "b", respectively, in the absolute coordinate system. "Offset from each origin to the left end of an object displayed in the box" and "offset from each origin to the top of an object displayed in the box" are converted to "c" and "d", respectively, in the absolute coordinate system. Further, "width of each object" is converted to "e" in the absolute coordinate system.

If the above-described conversion relationship is used, the display position of an object with a coordinate in the virtual coordinate system that is (X, Y)=(n, m) is expressed as follows in the absolute coordinate system.

x coordinate of the left end of the object=nb+c
y coordinate of the top of the object=ma+d The starting point of a line is expressed as follows in the absolute coordinate system.

x coordinate of the staring point of a line=nb+c+e
y coordinate of the staring point of a line=ma+d Next, the editing method shown in FIGS. 18 through 29 is described in detail with reference to flowcharts. User operations are the same as the procedure shown in FIG. 10. Since the simplified flowchart is as shown in FIG. 11, it is omitted here. Further, a process for detecting a line selected by the user and registering it in the selection index table is basically the same as the procedure given in the flowchart shown in FIG. 12.

Figure 31:
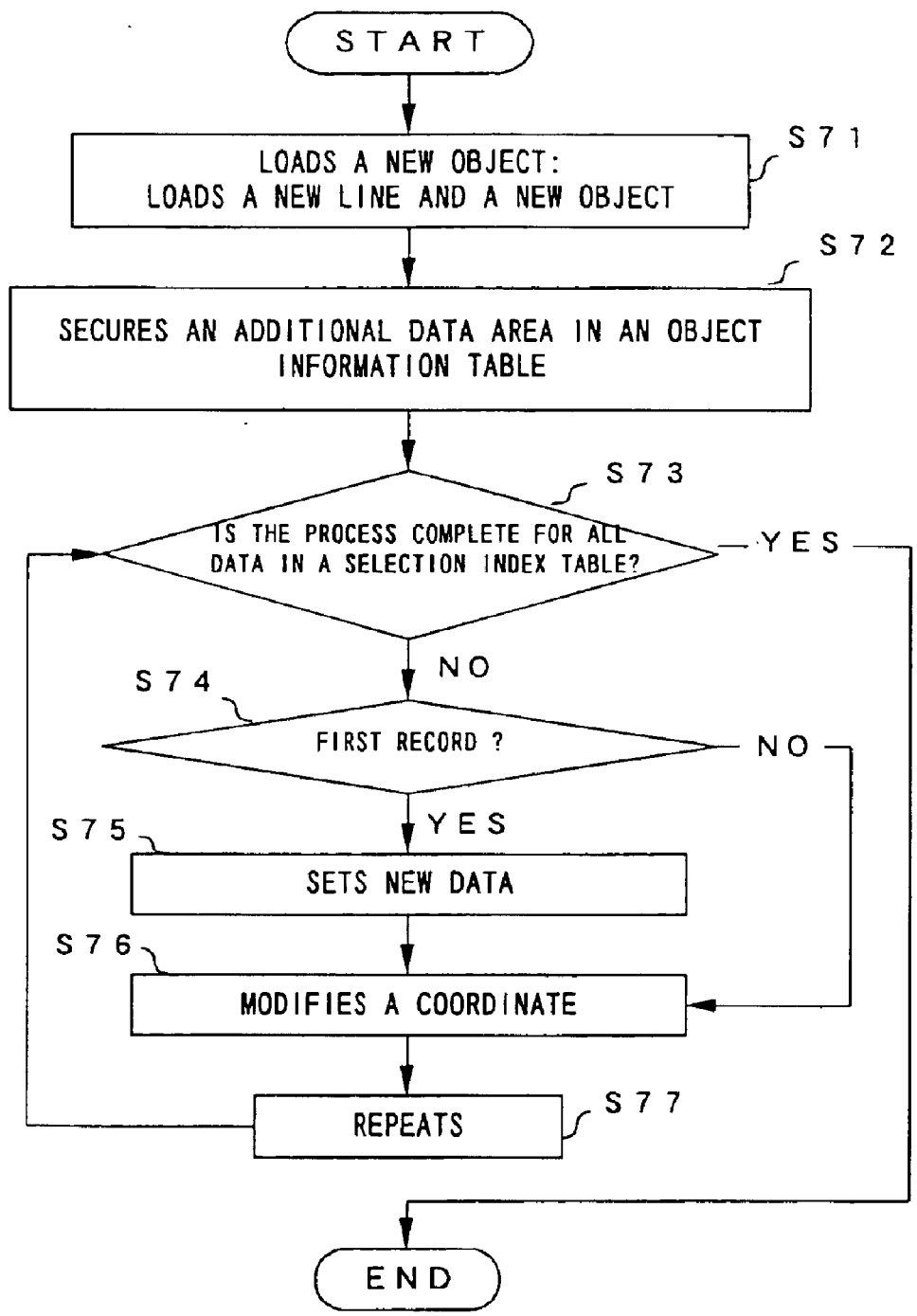
FIG. 31 is a flowchart showing a process for updating graphic data.

FIG. 31 is a detailed flowchart of "update of graphic data", and corresponds to the process in step S12 shown in FIG. 11. A process in this flowchart is executed for each record registered in the selection index table in order. That is to say, this process is executed for each line designated by the user.

In step S71, data for drawing a new object and a new line are loaded in a predetermined area of a memory. In step S72, a record for the new object and a record for the new line are added to the object information table and the line information table, respectively.

Steps S73 and S77 are for sequentially extracting records from the selection index table and one by one. In step S74, it is checked whether the record extracted in step S73 is the first record in the selection index table. If it is the first record, a process in step S75 is executed, and if it is not, step S75 is skipped.

Step S75 is for setting data to display a new object. Step S76 is a coordinate conversion process which is required when a new object is inserted. A process in steps S75 and S76 is described in detail later.

With the above-described process, data for displaying a new object are set. The coordinate of the display position of objects connected to the rear side of a line designated by a user is updated. Further, a line connecting objects with each other is reset.

Figure 32:
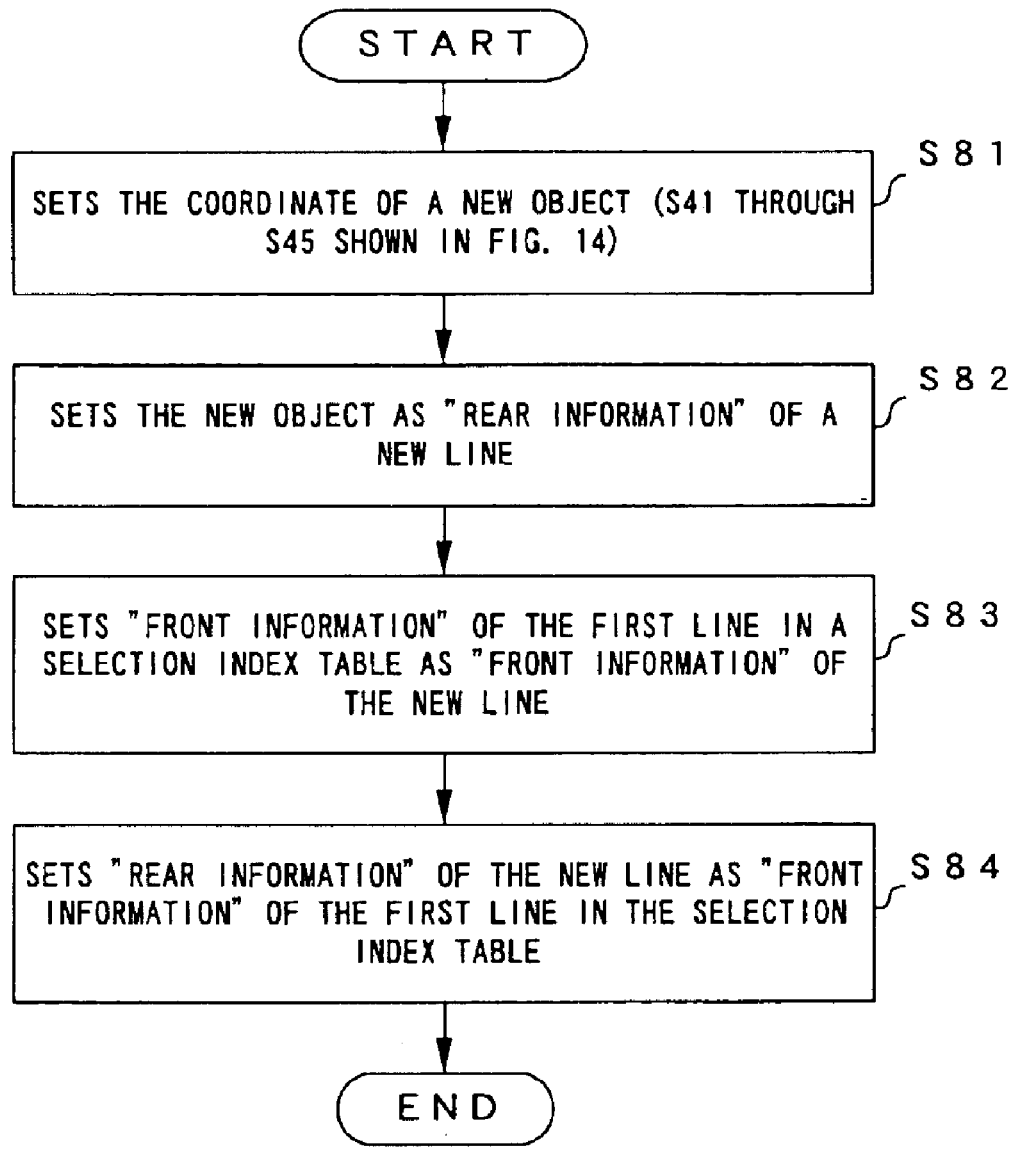
FIG. 32 is a flowchart showing a process for setting data to display a new object.

FIG. 32 is a detailed flowchart showing a process for setting data for displaying a new object, and it corresponds to the process in step S75 shown in FIG. 31. A process in this flowchart is executed only for the first record in the selection index table.

In step S81, both "X coordinate" and "Y coordinate" of a new object are set in the object information table. This process is the same as the process in steps S41 through S45 of the flowchart shown in FIG. 14.

In step S28, the new object is set as "rear information" of a new line. Specifically, "index" for identifying a record for the new object in the object information table, is written in the line information table as "rear information" of the new line.

In step S83, a object connected to the front end of a line selected by a user is set as "front information of the new line. Specifically, in the line information table, "front information" of a line specified by "selection position" stored in the first record of the selection index table is written in "front information" of the new line.

In step S84, "rear information" of the new line is set as "front information" of a line corresponding to the first data in the selection index table. Specifically, in the line information table, "rear information" of the new line is written as "front information" of a line specified by "selection position" stored in the first record of the selection index table.

Figure 33:
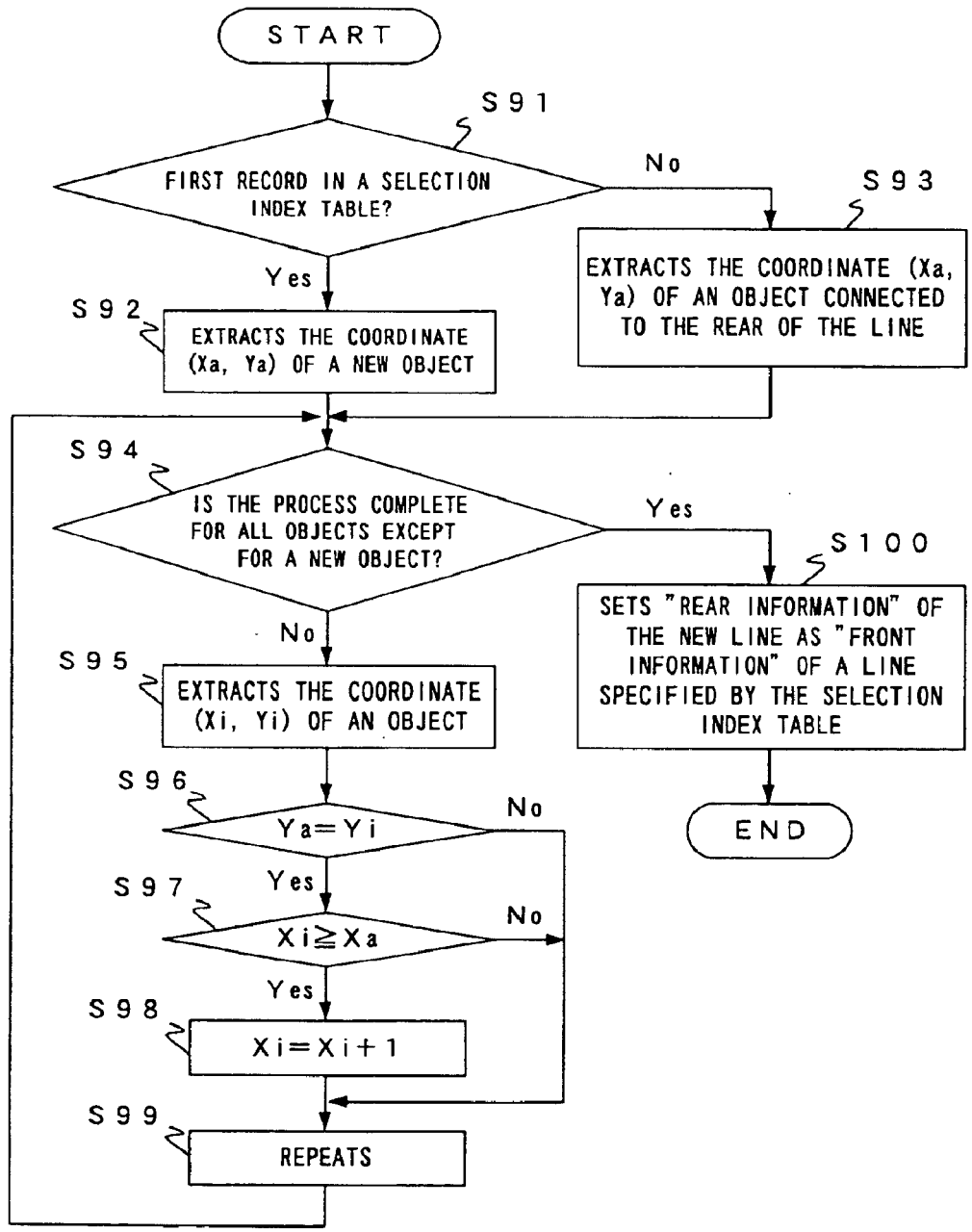
FIG. 33 is a detailed flowchart showing a process for modifying a coordinate to display objects previously displayed, if necessary.

FIG. 33 is a detailed flowchart showing a process for modifying a coordinate for displaying objects previously displayed, if necessary, and it corresponds to the process in step S76 shown in FIG. 31. A process in this flowchart is executed for each record registered in the selection index table.

In step S91, it is checked whether a record to be processed is the first record in the selection index table. If it is, in step S92, the coordinate of the new object is extracted from the object information table. If it is not, in step S93, the coordinate of an object connected to the rear end of the line is extracted. In the following description, the coordinate extracted in step S92 or S93 is assumed to be (Xa, Ya).

Steps S94 and S99 are for sequentially extracting records (excluding a record for the new object) registered in the object information table one by one and executing steps S95 through S98 for each extracted record.

In step S95, the coordinate of an object with a record that is extracted in step S94, is obtained. In the following description, this coordinate is assumed to be (Xi, Yi). In step S96, it is checked whether "Ya=Yi" is satisfied. If it is, step S97 is executed, and if it is not, steps S97 and S98 are skipped. In step S97, it is checked whether "Xi≧Xa" is satisfied. If it is, step S98 is executed, and if it is not, step S98 is skipped. Then, in step S98, "1" is added to "X coordinate" obtained in step S95.

After steps S96 through S98 are executed for all records (excluding a record for the new object), the flow proceeds to step S100. In step S100, "rear information" of the new line is set as "front information" of a line specified by the selection index table.

In this preferred embodiment, since a graphic drawn according to a rule stating that if the second object is subordinated to the first object, the second object is connected to the right side of the first object, is used, the second object is laterally shifted when the third object is inserted between the first and second objects. However, the present invention is not limited to this configuration. For example, if a graphic, drawn according to a rule stating that if the second object is subordinated to the first object, the second object is connected to the bottom of the first object, is used, the second object can also be moved downward when the third object is inserted between the first and second objects.

In this case, the direction in which an object is moved is judged by comparing the coordinates of two objects, each connected to the front end and rear end of a line selected by a user. For example, if the Y coordinates of two objects, each connected to the front end and rear end of a line selected by a user are the same, the object connected to the rear end of the line is moved laterally, and if their X coordinates are the same, the object connected at the rear end of the line is moved downward. In order to vertically move an object, it is sufficient if its "Y coordinate" is modified in the object information table.

The Second Preferred Embodiment

According to the above-described editing method in the first preferred embodiment, a user must directly designate a line displayed in the position where a new object is to be inserted. However, according to the second preferred embodiment, the user does not have to directly designate the line, and he or she can insert the object between desired objects by moving an object to be inserted to a prescribed target position.

Figure 34A:
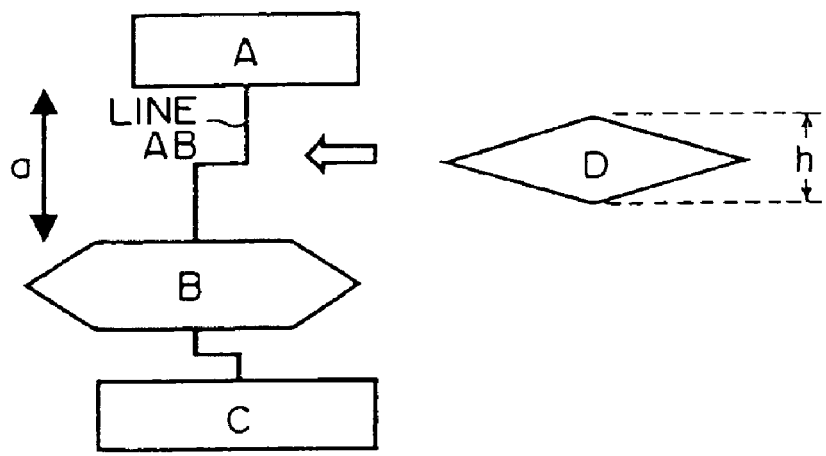
FIGS. 34A through 34C explain the operation of the graphic editing method in the second preferred embodiment.
Figure 34B:
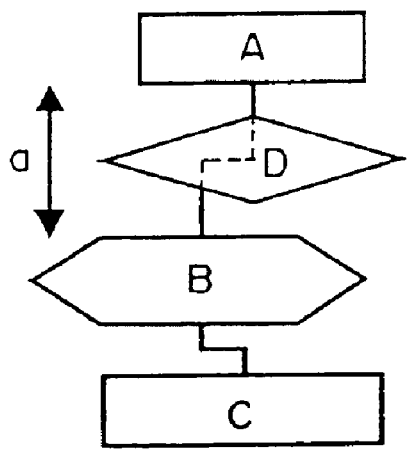
Figure 34C:
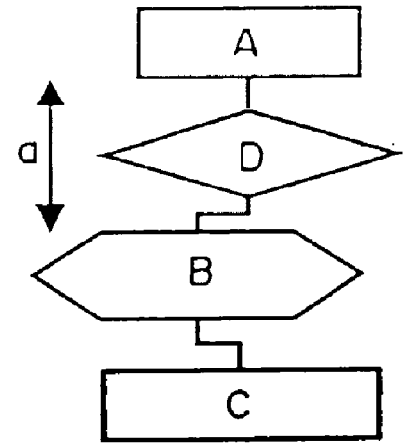

FIGS. 34A through 34C explain the operation of the graphic editing method in the second preferred embodiment. Here, an operation in the case where object D is inserted between objects A and B in a flowchart where objects A through C are connected in series is described.

As shown in FIG. 34A, the user first drags object D using a mouse, etc., and as shown in FIG. 34B, drops object D so as to overlap line AB which connects objects A and B. Upon detecting the overlapping of line AB and object D, as shown in FIG. 34C, the graphic editing software connects objects A and D, and simultaneously connects objects D and B.

The connection is conducted using a connector object. This insertion process deletes line AB (connector object) and generates two new connector objects (a connector object for connecting objects A and D and a connector object for connecting objects D and B). Line AB can also be replaced with either of the two connector objects without deleting line AB. In this case, the connector object can be connected at any point on the outer circumference of an object.

It is preferable that each object has a predetermined point at which a line should be connected. For example, for an rectangular object, such as object A, a line is connected at the mid-point of the long side of a rectangle. For a rhombus, such as object D, a line can be connected at its arbitrary vertex.

Figure 35A:
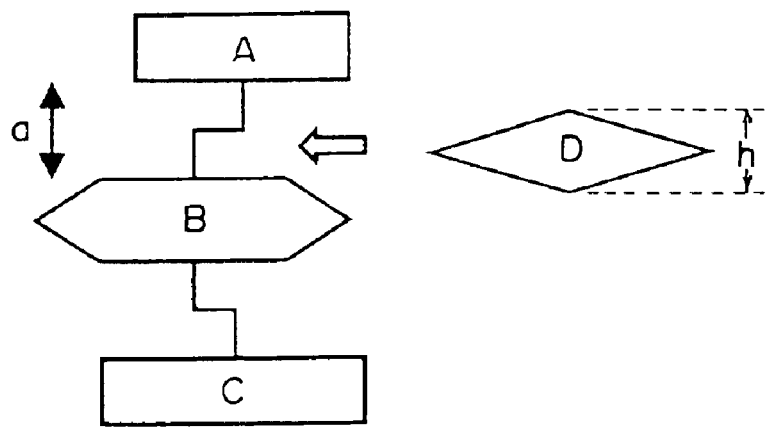
FIGS. 35A through 35C explain another operation of the graphic editing method in the second preferred embodiment.
Figure 35B:
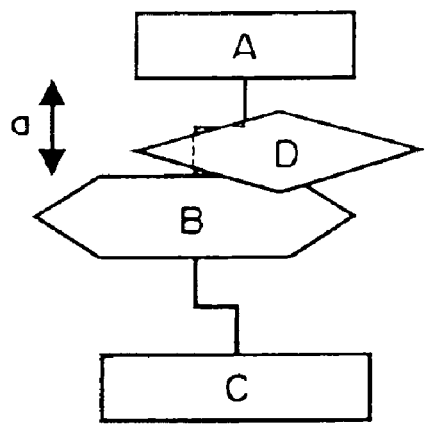
Figure 35C:
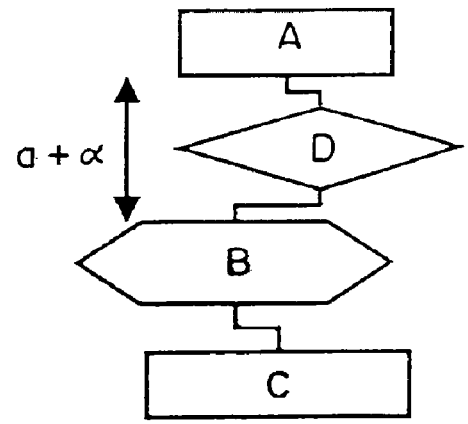
Figures 36A, 36B:
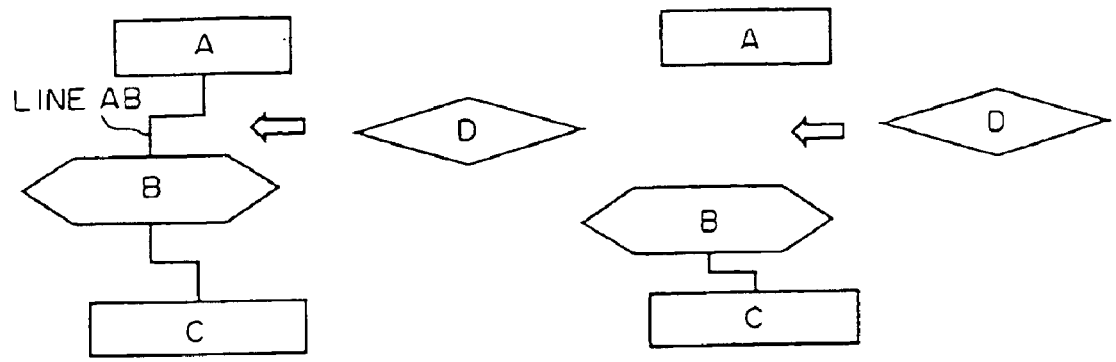
FIGS. 36A through 36D explain a user operation according to a conventional editing method (No. 1).
Figures 36C, 36D:
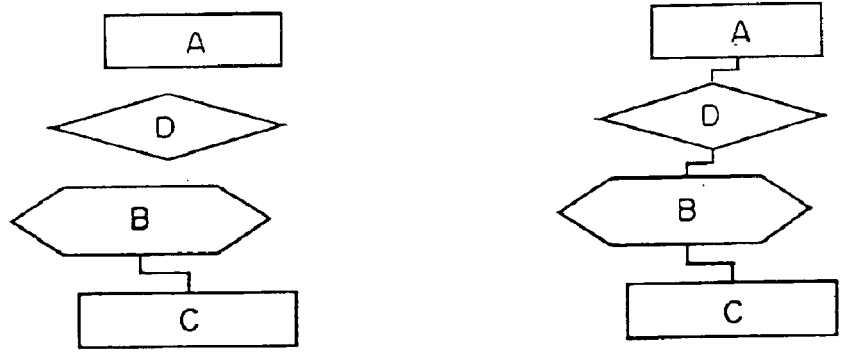

FIGS. 35A through 35C explain another operation of the graphic editing method in the second preferred embodiment. Here, as shown in FIG. 35A, it is assumed that a distance (longitudinal length) a between objects A and B is not sufficient compared with the height h of object D. In this case, as shown in FIG. 35B, if object D is dropped so as to overlap line AB connecting objects A and B, the graphic editing software automatically expands the distance between objects A and B, and inserts object D between them. In this example, the distance between objects A and B is expanded by moving object B downward. A process for connecting objects A and D and simultaneously connecting objects D and B is the same as the process shown in FIG. 34. As a result, a state shown in FIG. 35C is obtained.

In this way, according to the editing method in the second preferred embodiment, when a user wants to insert a new object between the first and second objects connected with each other, it is sufficient to move the new object to be inserted so as to overlap a line connecting the first and second objects. With this operation, a line between objects is automatically reset, and each object is re-located, if necessary.

Figure 37A:
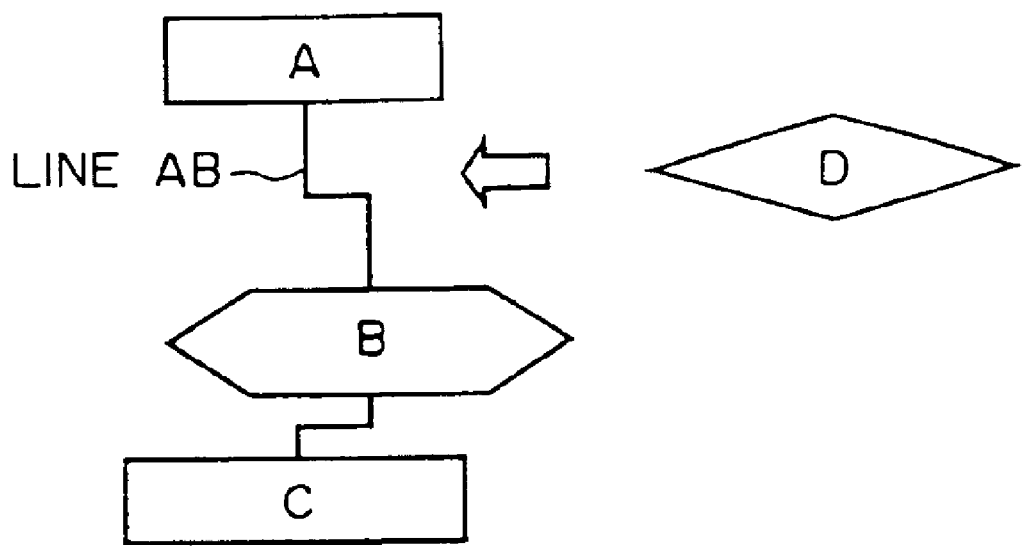
FIGS. 37A through 37B explain a user operation according to a conventional editing method (No. 2).
Figure 37B:
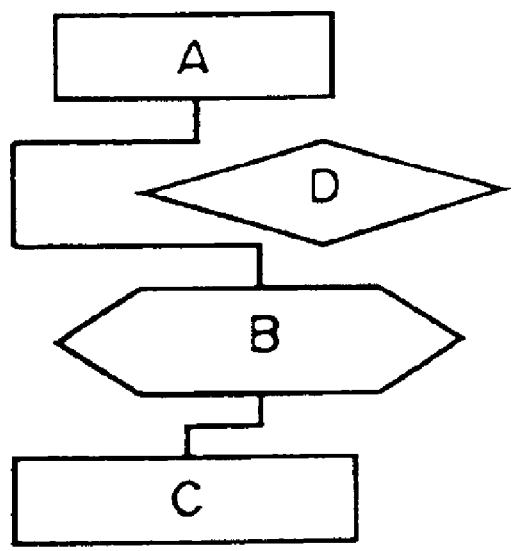

If a job similar to the editing job shown in FIGS. 34A through 34C is performed using the conventional graphic editing software, for example, as that shown in FIGS. 36A through 36D (Microsoft's Power Point 97), job for deleting line AB, job for moving object D and job for connecting objects is required, and thereby the burden on a user dramatically increases. In some conventional editing methods such that as shown in FIGS. 37A and 37B (Visio Professional 5.0 for Microsoft Windows), a line is transformed as an object is moved. However, even in this case, since finally a user must reset the line, it cannot be said that the burden on a user is reduced.

Figure 39:
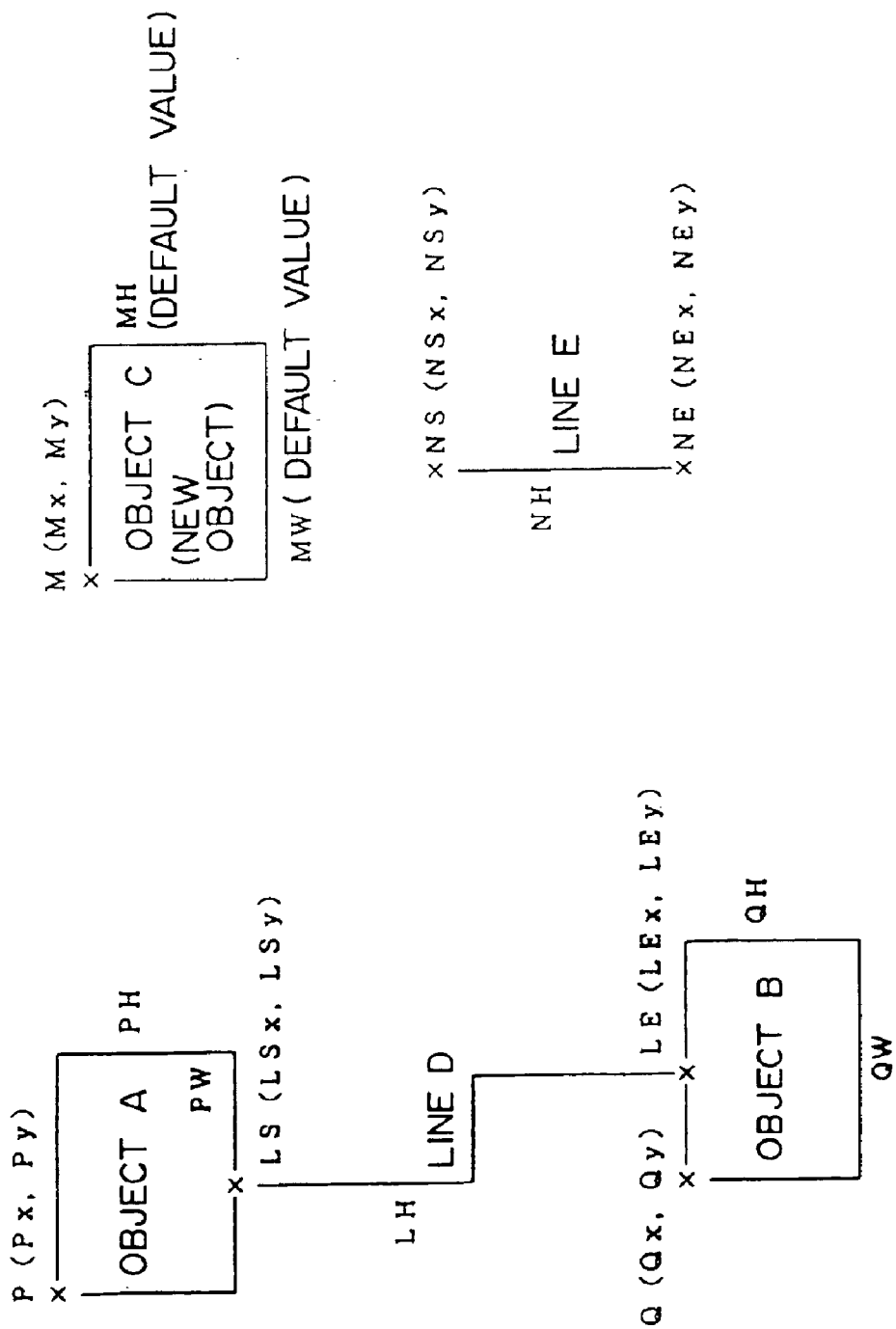
FIG. 39 explains the display coordinates of both an object and a line, etc.

FIG. 38A is an example of an object information table. The object information table stores the coordinate of the displayed position of each object, information about the shape of the object, etc. As "coordinate", as shown in FIG. 39, the absolute coordinate located at the upper left corner of each object is stored. For "shape", information for identifying graphic components provided by application software is used. The application software provides a rectangle, a rhombus, a circle, etc., as graphic components. As specific information for indicating the shape of each object, "height" and "width" of the object are stored.

FIG. 38B shows an example of the line information table. The line information table stores information for specifying the display position and shape of each line and information for indicating the connection relationship between objects. "Starting point" and "end point" are the coordinate of the starting point and the coordinate of the end point of each line, respectively. "Front information" and "rear information" are the same as the front and rear information described in the first preferred embodiment, and is information for specifying an object connected at the front end of each line and information for specifying an object connected to the rear end of each line, respectively. A connecting point of each line and an object on the front side is "starting point coordinate", and a connecting point of each line and an object on the rear side is "end point coordinate". "Height" indicates a difference between the Y coordinate of the starting point and the Y coordinate of the end point of each line.

The subordinate relationship between objects is managed using this line information table. For example, in a table shown in FIG. 38B, the fact that object B is subordinated to object A is registered.

FIG. 40 is a flowchart showing the user operation procedure of the editing method in the second preferred embodiment. In step S201, a new object to be inserted is created. A method for creating an object is the same as the method described in the first preferred embodiment. In step S202, the new object created in step S201 is moved to a desired position using a mouse, etc. Specifically, for example, the new object is dropped in the desired position as shown in FIG. 34B. In this way, according to the editing method in the second preferred embodiment, the burden on a user is further reduced compared with that of in the first embodiment.

Figure 41:
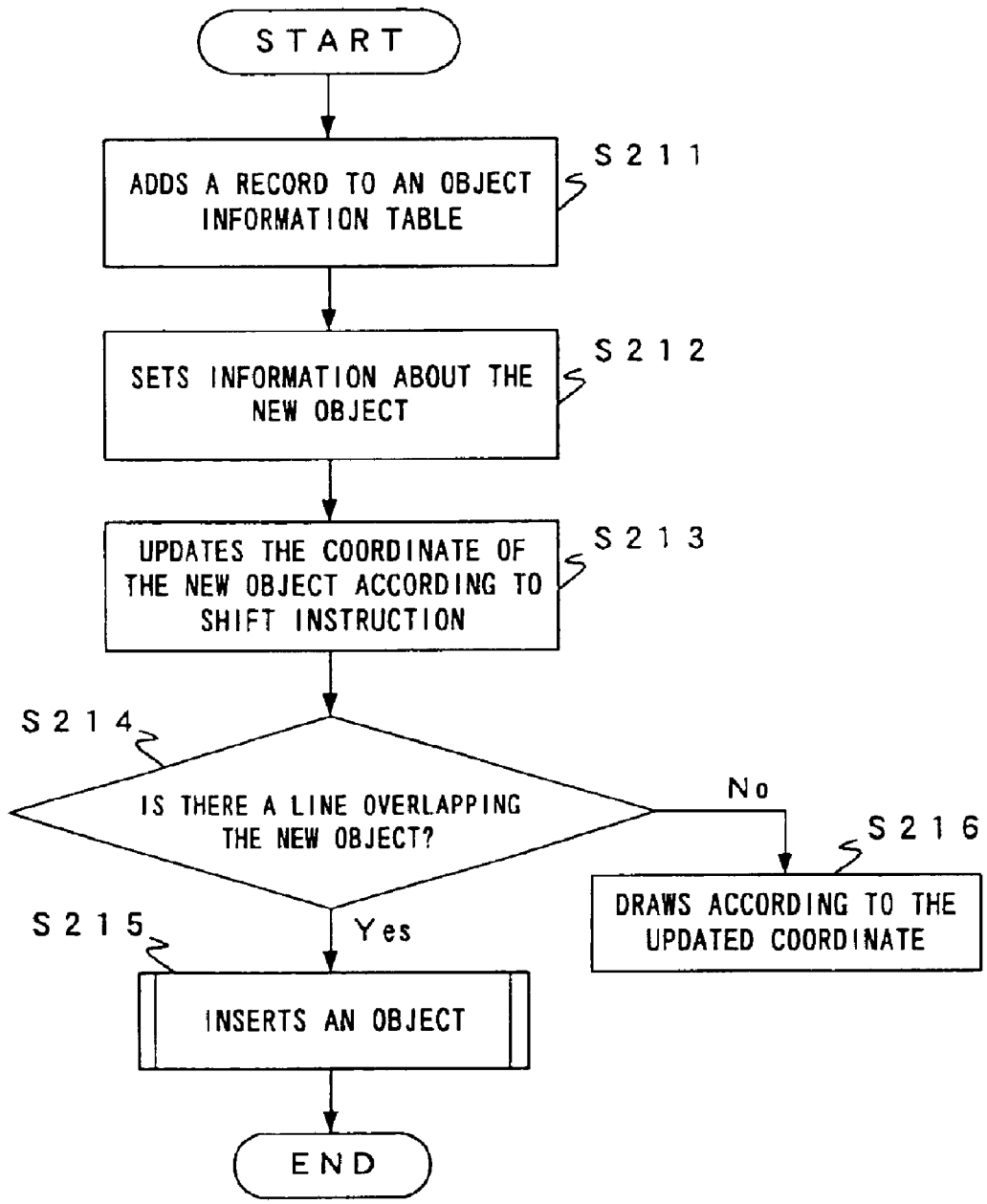
FIG. 41 is a flowchart showing the operation of the graphic editing software in the second preferred embodiment.

FIG. 41 is a flowchart showing the operation of the graphic editing software in the second preferred embodiment. A process in this flowchart is executed when a user creates a new object. Specifically, this process starts when step S201 in the flowchart shown in FIG. 40 is executed. This process is described below using an example of process for inserting object C between objects A and B connected with each other using line D.

In step S211, a record for object C created by a user is added to the object information table. In step S212, information about object C is written to the record added in step S211. In the example shown in FIG. 38A, "coordinate=(Mx, My)", "shape=rectangle", "height=MH", and "width=MW" are written in the record of "index=3".

In step S213, when the user moves object C, the coordinate of object C is updated according to the move instruction. In step S214, it is checked whether a line overlapped by object C exists. In this judgment, "coordinate", "height" and "width" of object C, and "starting point coordinate", "end point coordinate", and "height" of each line stored in the line information table are used.

If a line overlapped by object C exists, in step S215, an object insertion process is executed, and if not, in step S216, object C is drawn according to modified coordinates.

FIG. 42 is a detailed flowchart showing an object insertion process. This process corresponds to step S215 shown in FIG. 41.

In step S221, "height" of a line which overlaps object C by the user operation is acquired. In this preferred embodiment, "height of line=LH" is obtained from the line information table. In step S222, "height" of object C is acquired. In this preferred embodiment, "height of object= MH" is obtained from the object information table.

In step S223, it is checked whether "height" of a line acquired in step S221 is sufficiently great compared with "height" of an object acquired in step S222. Specifically, it is checked whether the following condition is satisfied.

$$LH > MH + 2\alpha$$

Wherein "α" is the minimum value of a line length, which is predetermined.

If this condition is not satisfied, it is judged that sufficient space to insert object C does not exist, and a process in step S224 is executed. If the condition is satisfied, step S224 is skipped.

In step S224, an object in the vicinity is moved such that object C will be inserted. In this preferred embodiment, a coordinate for displaying object B is modified. In step S225, information about object C is updated. Specifically, a record for object C is updated in the object information table.

In step S226, a new line is created. Specifically, first, a record for the new line (in this preferred embodiment, line E connecting objects A and C) is added to the line information table, and a variety of information is set in the record. In step S227, the setting of the line in the vicinity is updated. In this preferred embodiment, the setting is modified in such a way that line D which connected objects A and B newly connects objects C and B. Specifically, "connection information (front information and/or rear information)", "coordinate (starting point coordinate and/or end coordinate)" and "height" are modified in the line information table, if necessary.

In step S228, a graphic is drawn according to both the object information table and line information table updated in steps S224 through S227.

Next, a specific process in steps S224 through S227 is described using the display state shown in FIG. 39.

(1) Setting of object B

New $Qx=Qx$

New $Qy=LSy+MH+2\alpha$ (2a) Setting of object C (when object B is not moved)

$Mx=Px+((Qx-Px))/2)$ $My=Lsy+(LH/2)-(MH/2)$ (2b) Setting of object C (when object B is moved)

$Mx=Px+((Qx-Px)/2)$ $My=LSy+\alpha$ (3a) Setting of a new line E (when object B is not moved)

$NSx=LSx$ $NSy=LSy$ $NH=(LH/2)-(MH/2)$ $NEx=Mx+(MW/2)$ $NEy=My$ (3b) Setting of a new line E (when object B is moved)

$NSx=LSx$ $NSy=LSy$ $NH=\alpha$ $NEx=Mx+(MW/2)$ $NEy=My$ (4a) Setting of a new line D (when object B is not moved)

New $LSx=Mx+(MW/2)$

New $LSy=My+MH$

New $LH=(LH/2)-(MH/2)$

New $LEx=LEx$

New $LEy=LEy$ (4b) Setting of a new line D (when object B is moved)

New $LSx=Mx+(MW/2)$

New $LSy=My+MH$

New $LH=\alpha$

New LEx=LEx

New LEy=New Qy

Figure 43:
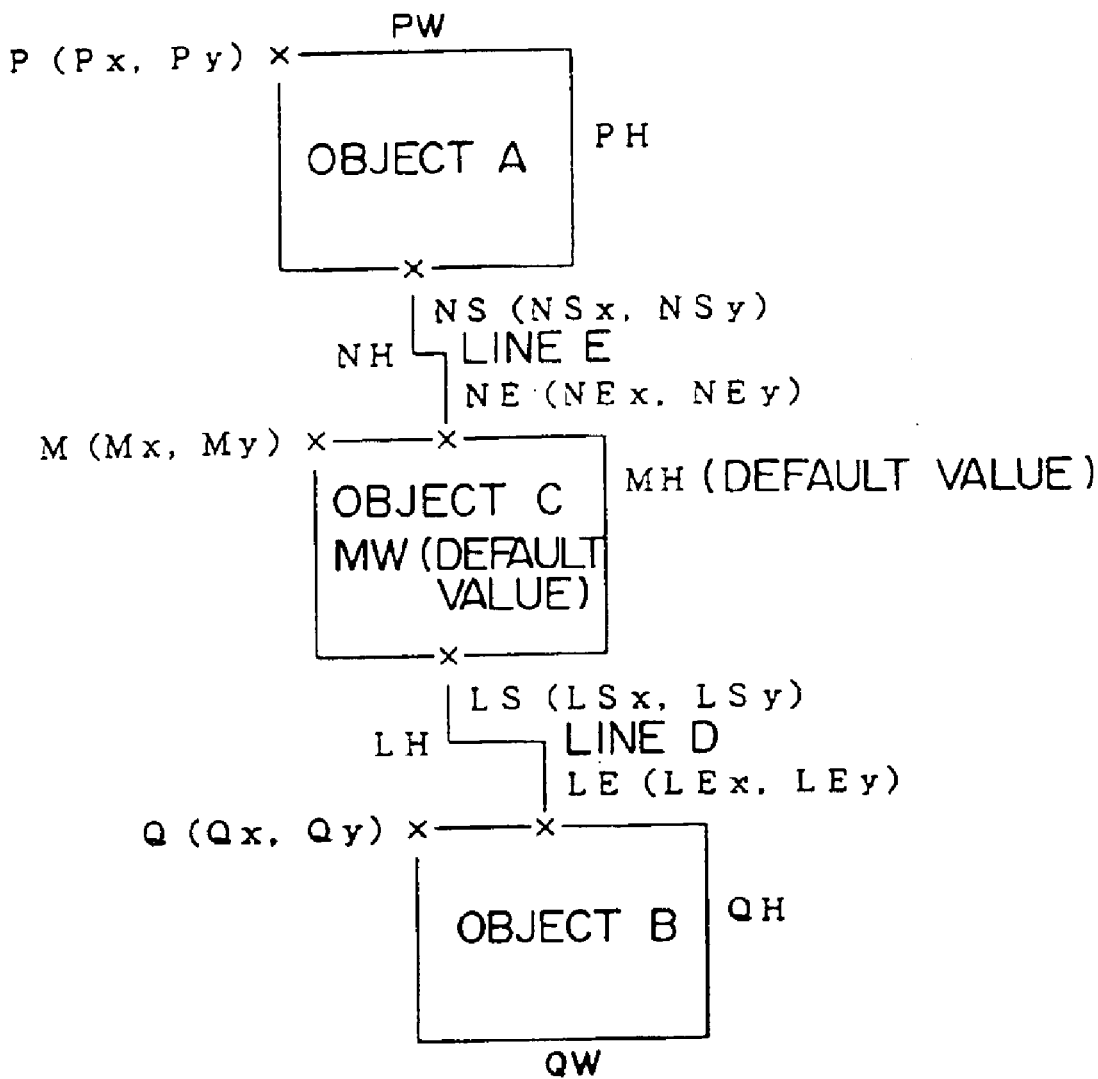
FIG. 43 shows the result of an object insertion process.

FIG. 43 shows a graphic displayed according to the object information table and line information table which was updated by the above-described operation.

Figure 44:
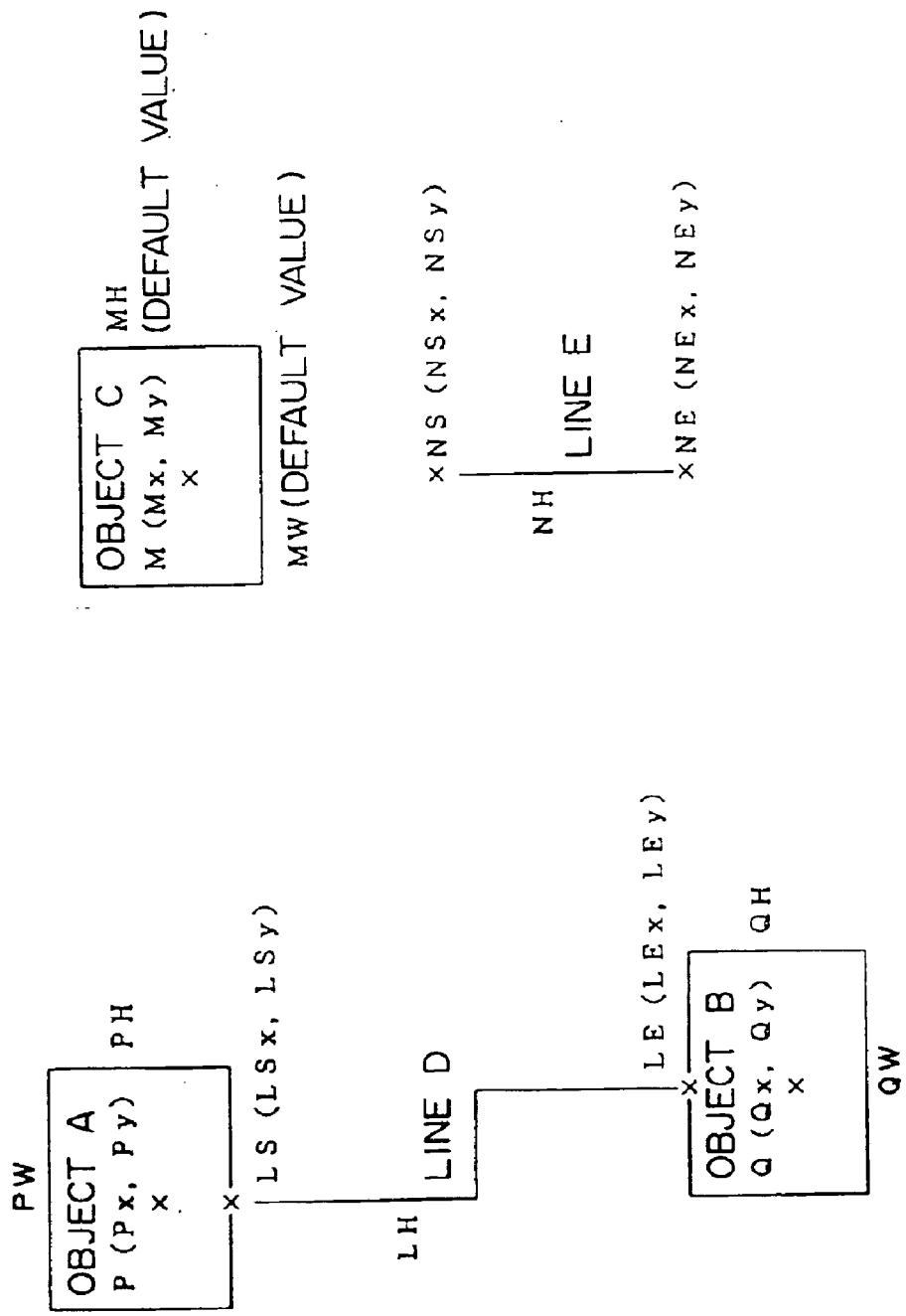
FIG. 44 explains another display method.

Although in the preferred embodiment shown in FIGS. 38 through 43, the position of each object is indicated using the coordinate at the upper left corner of the object, the present invention is not limited to this method. For example, as shown in FIG. 44, the position of each object can also be indicated using the coordinate at the center of the object. In this case, the operation in steps S224 through S227 shown in FIG. 42 becomes as follows. Point P, point Q and point M are the central points of objects A, B and C, respectively.

(1) Setting of Object B

New Qx=Qx

New $Qy=LSy+MH+2\alpha$ (2a) Setting of object C (when object B is not moved)

$Mx=Px+((Qx-Px)/2)$ $My=LSy+(LH/2)$ (2b) Setting of object C (when object B is moved)

$Mx=Px+((Qx-Px)/2)$ $My=LSy+\alpha$ (3a) Setting of a new line E (when object B is not moved)

NSx=LSx

NSy=LSy $NH=(LH/2)-(MH/2)$

NEx=Mx $NEy=My-(MH/2)$ (3b) Setting of a new line E (when object B is moved)

NSx=LSx

NSy=LSy $NH=\alpha$

NEx=Mx $NEy=My\alpha(MH/2)$ (4a) Setting of a new line D (when object B is not moved)

New LSx=Mx

New $LSy=My+(MH/2)$

New $LH=(LH/2)-(MH/2)$

New LEx=LEx

New LEy=LEy (4b) Setting of a new line D (when object B is moved)

New LSx=Mx

New $LSy=My+(MH/2)$

New $LH=\alpha$

New LEx=LEx

New LEy=New Qy

Figure 45:
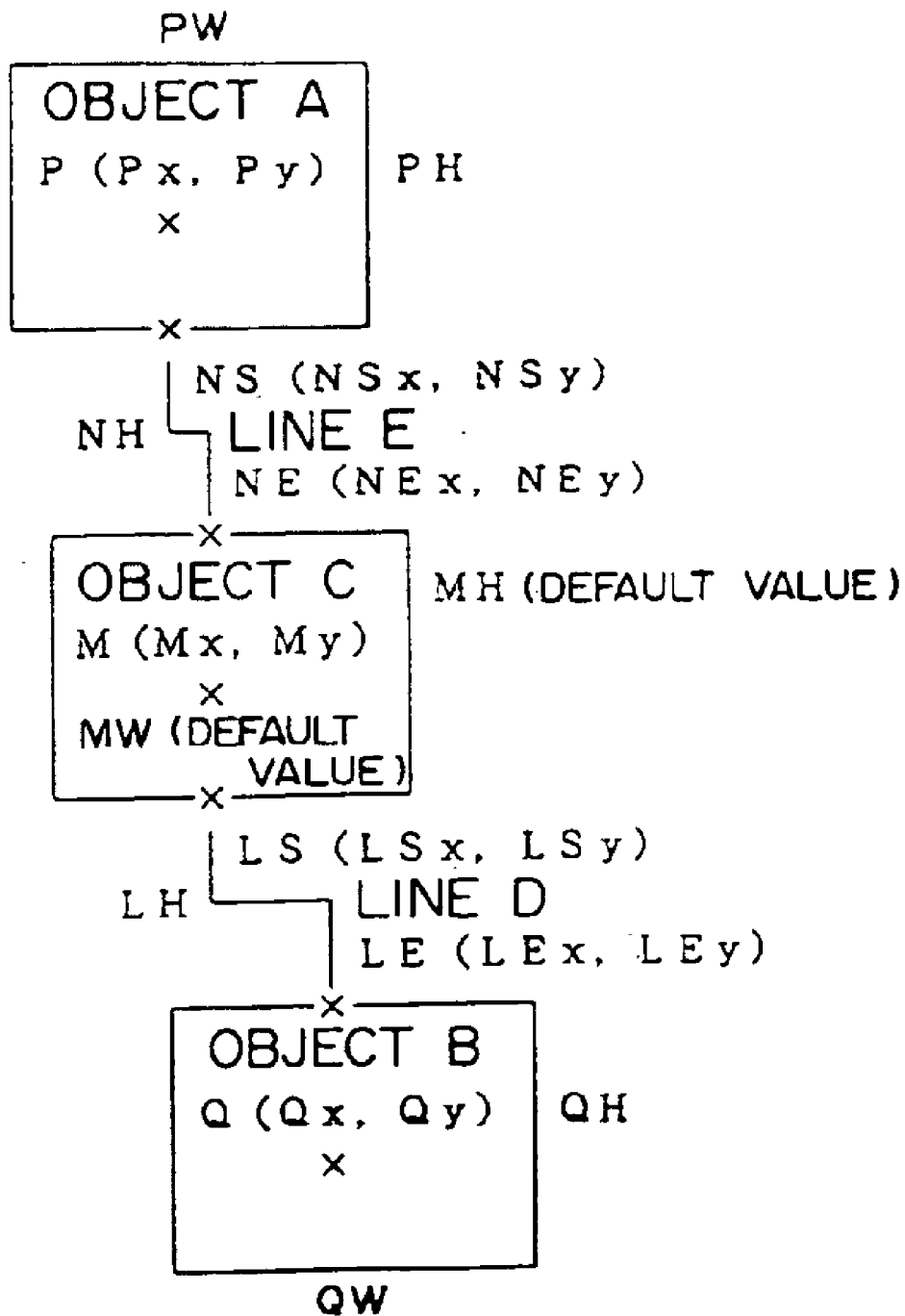
FIG. 45 shows the result of the object insertion process according to another display method.

FIG. 45 shows a graphic displayed according to the object information table and line information table which was updated by the above-described operation.

Figure 46A:
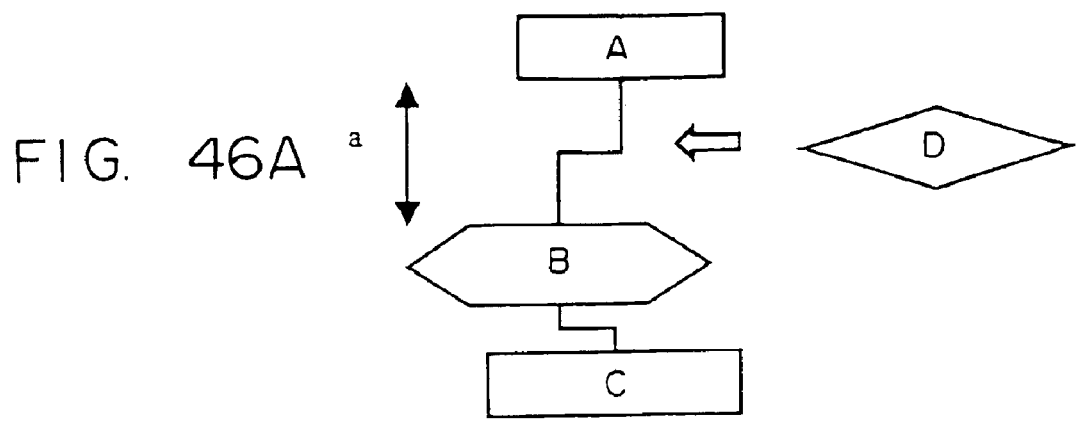
FIGS. 46A through 46C shows an alternative in the second preferred embodiment.
Figure 46B:
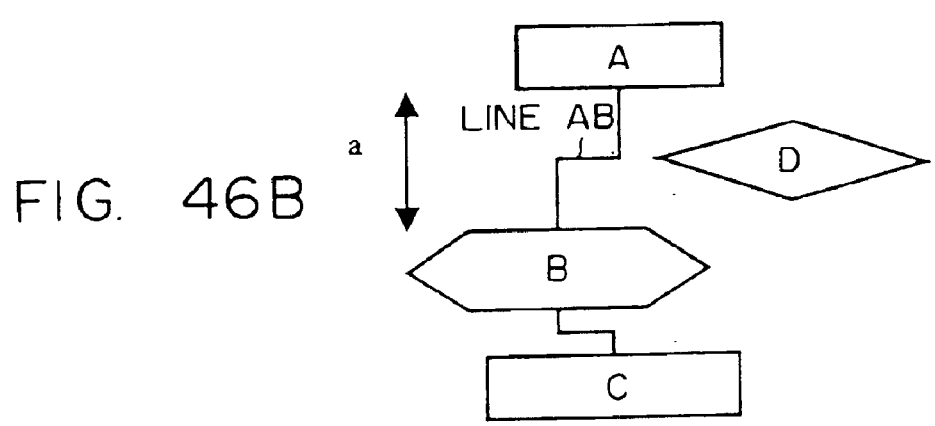
Figure 46C:
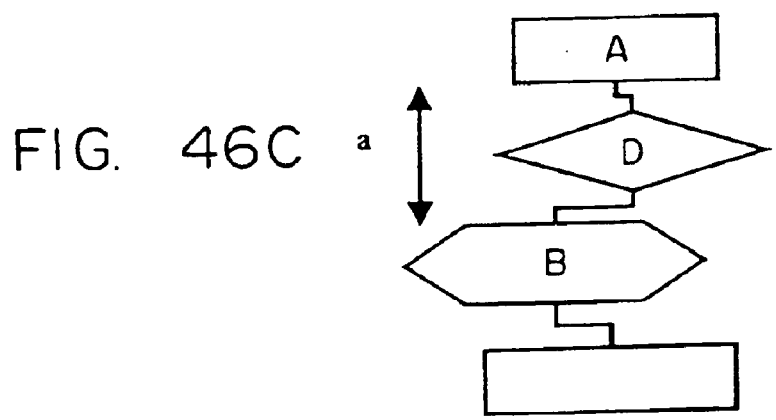

In the preferred embodiment shown in FIGS. 34A through 34C and FIGS. 35A through 35C, after it is detected that an object has been dropped on a line, an insertion process is executed. However, the second preferred embodiment is not limited to this method. For example, as shown in FIGS. 46A through 46C, a system can also be configured such that if it is detected that a new object (object D) has been dropped in the vicinity of line AB, the new object can be inserted between objects A and B. Alternatively, if it is detected that an object has been dragged (not dropped) on or into the vicinity of the line, the above-described insertion process can be executed. In this case, while an object is located on or in the vicinity of the line, the shape of a line object newly created varies depending on the position of the object.

In each example of the first and second preferred embodiments, a case where a new object is inserted in a graphic previously displayed has been described. However, the present invention is not limited to this. For example, the editing method of the present invention also includes an operation for moving object C between objects A and B in a graphic where objects A, B, and C are connected in alphabetical order.

In the above-described example, a description is given using a flowchart as an example of a graphic to be edited. However, the present invention is not also limited to this, and it includes a method for editing a graphic, etc., in which a plurality of objects are connected or linked with each other using a line or connector. For example, the present invention can also be applied to a method for drawing and editing a circuit diagram. In this case, each element composing a circuit is an "object", and a signal line connecting the elements is a "line".

Although a state in which one object is connected to the front (front of object A) or rear (rear of object B) of an object to be inserted is shown in FIGS. 34 and 35, two or more objects can be connected instead of one. In the case of a flowchart, this means the branching of a flow, and in the case of a circuit it means that two or more circuit elements are connected. This connection relationship is managed using the object information table and the line information table shown as an example in FIG. 38, in the same way as in the above-described connection relationship. In this case, an insertion process is executed while maintaining the connection relationship.

Figure 47:
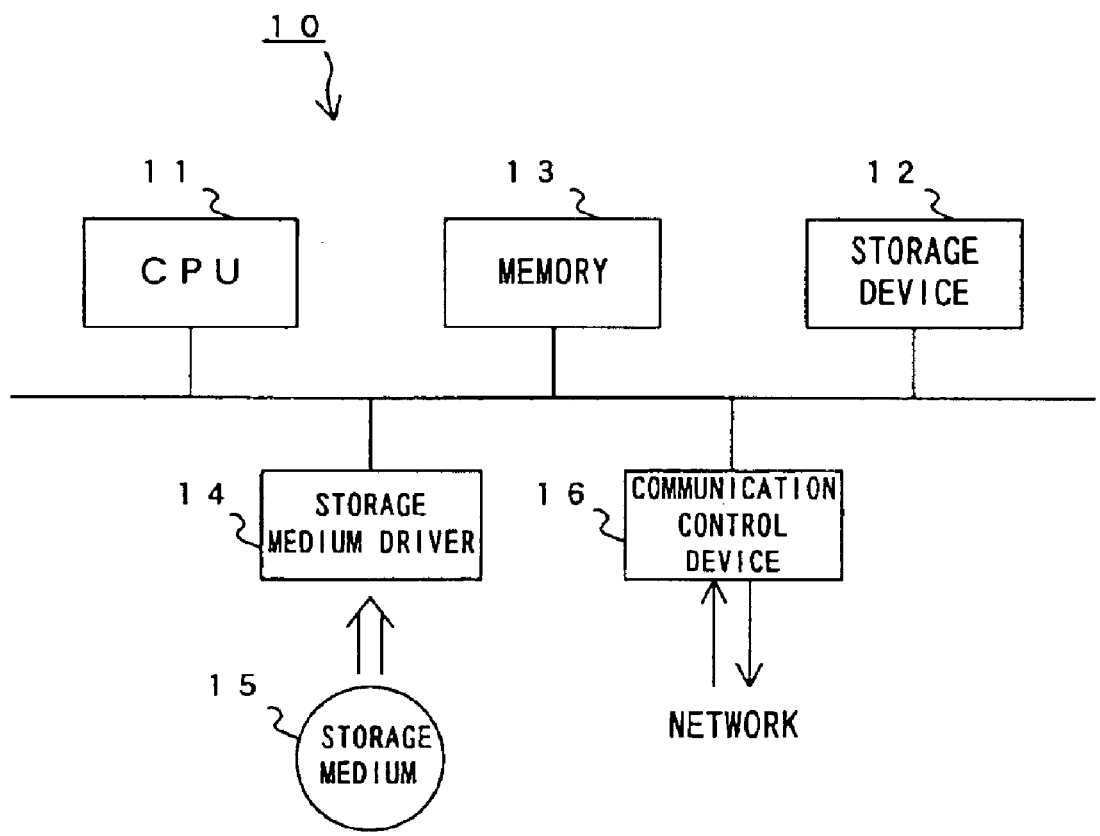
FIG. 47 shows the configuration of a computer executing a program in which the process of the editing method of the present invention is described.

The graphic editing function of the present invention is realized by enabling a computer to execute a program which describes the process shown in the above-described flowchart. FIG. 47 shows the configuration of a computer 10 which executes the program.

A CPU (central processing unit) 11 loads a program which describes the process in the above-described flowchart from a storage device 12 to a memory 13, and executes it. The storage device 12 is, for example, a hard disk, and it stores the program. The memory 13 is, for example, a semiconductor memory, and it is used for the working area of the CPU 11. A variety of tables are created in this memory 13.

A storage medium driver 14 accesses a portable storage medium 15 according to the instruction of the CPU 11. The portable storage medium 15 includes a semiconductor device (IC card or PC card, etc.), a medium in which information is inputted and outputted by way of a magnetic function (floppy disk, magnetic tape, etc.) and a medium in which information is inputted and outputted by way of an optical function (optical disk, etc.). A communication control device 16 transmits and receives data to or from a network according to the instruction of the CPU 11.

Figure 48:
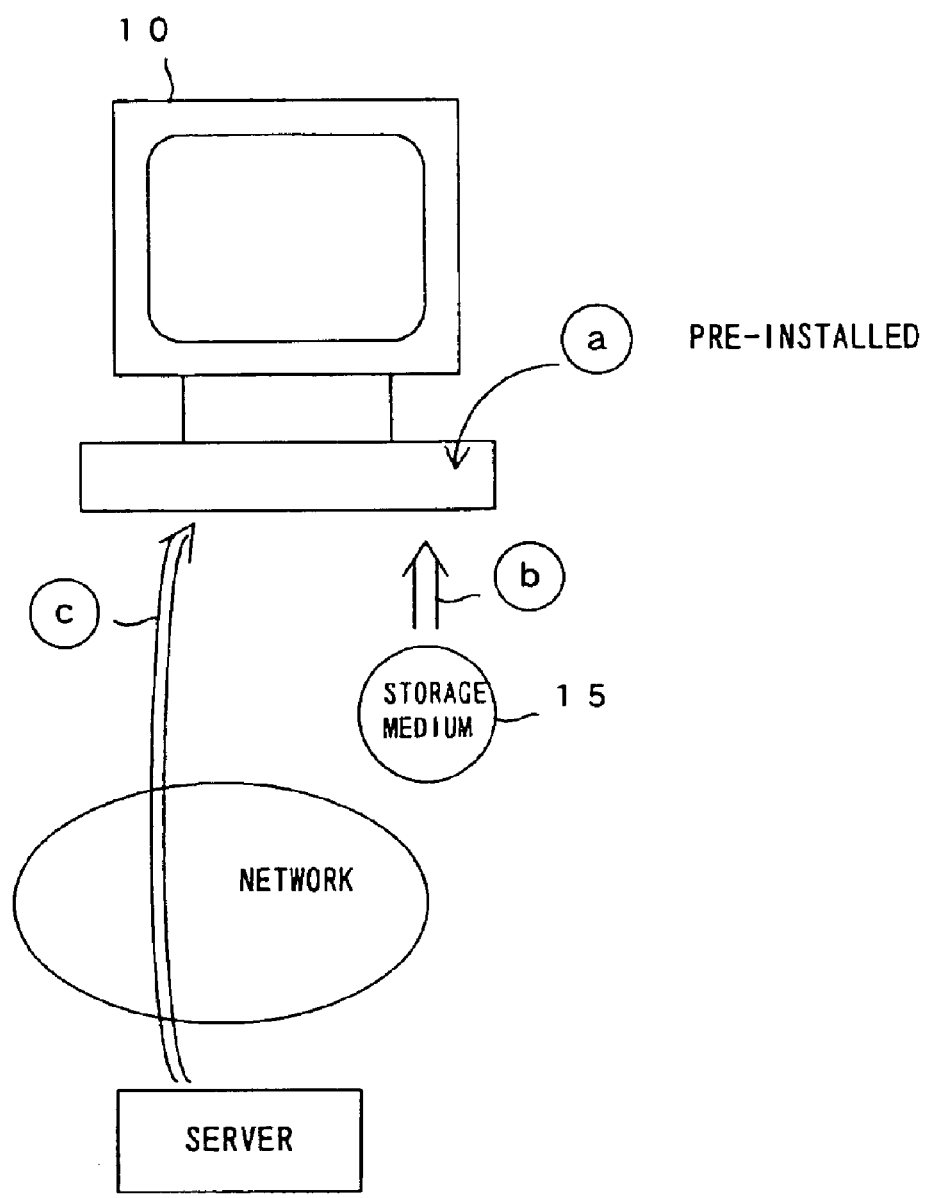
FIG. 48 explains how to provide a software program, etc. relating to the present invention.

FIG. 48 explains how to provide a software program relating to the present invention, etc. The program relating to the present invention is, for example, arbitrarily provided for by one of the following three methods.

(a) The program is pre-installed in the computer 10 and is provided. In this case, a program, etc., is, for example, installed prior to shipment.

(b) The program is stored in a portable storage medium and is provided. In this case, the program, etc., stored in the portable storage medium 15 is installed in the storage device 12 through the storage medium driver 14.

(c) The program is provided by a server on the network. In this case, the computer 10 acquires the program, etc., by downloading the program, etc., stored in the server.

Since a process in the case where another object is inserted between objects connected with each other is simplified in a process for drawing and editing a graphic, etc., using a computer while displaying the graphic, etc., the burden on a user can be reduced, thereby improving the work efficiency. In addition, the possibility of a mistake occurring when a graphic is edited, can also be reduced.

What is claimed is:

1. A graphic editing apparatus, comprising:
    a display unit displaying a graphic including a first object and a second object which are connected with each other using a first connector, where the first object, second object, and first connector are all displayed on a display screen; and
    an interactive graphical editing unit judging movement of a third object while the user is interactively continuously moving the third object on the display relative to the graphic and automatically designating the first connector when it is judged that the moving third object comes to overlap the first connector after the first object, second object, and first connector have been displayed, and in response to the automatic designating automatically creating and displaying a second connector for connecting the displayed first object and the third object and a third connector for connecting the displayed third object and the second object.

2. The graphic editing apparatus according to claim 1, wherein the criteria is met when the first connector and the third object overlap each other during the moving of the third object on the display, in response to the automatic designating said interactive graphical editing unit also automatically creates and displays the second and third connectors.

3. The graphic editing apparatus according to claim 1, further comprising:
    a judgment unit judging automatically whether a distance between the first object and the second object is sufficient to accommodate the third object between them; and
    a shift unit, if the distance is not sufficient, automatically shifting at least one of the first and second objects.

4. The graphic editing apparatus according to claim 1, further comprising a management unit managing a subordinate relationship between objects, and
    the management unit, if the second object is subordinated to the first object before the third object is inserted between the first object and the second object, subordinating the third object to the first object and subordinating the second object to the third object.

5. A graphic editing apparatus, comprising:
    a display unit displaying a graph including a first object and a second object which are connected with each other using a first connector, where the first object, second object, and first connector are all displayed on a display screen; and
    an interactive graphical editing unit with an area on the display screen that is continuously interactively moved on the display relative to the graph by a user of said graphic editing apparatus, and during the continuous interactive movement on the display said editing apparatus judges the movement of the area and when it is judged that the moving designated area overlaps the first connector, the first connector is automatically selected after the first object, second object, and first connector have been displayed, and in response automatically creating and displaying a second connector for connecting the displayed first object and the third object and a third connector for connecting the displayed third object and the second object.

6. The graphic editing apparatus according to claim 5, wherein said interactive editing unit automatically shifts the displayed second object, displays the third object in a position where the second object was displayed before the first connector is interactively selected, and stops displaying the first connector.

7. The graphic editing apparatus according to claim 5, further comprising a coordinate system providing unit providing a virtual coordinate system defining boxes, in which each box is defined as area for displaying one object, wherein
    said display unit displays each object using the virtual coordinate system, and said interactive editing unit locates each object using the virtual coordinate system.

8. A graphic editing apparatus, comprising:
    a display unit displaying a graphic comprising a first object, a plurality of second objects and a plurality of first connectors for connecting the first object and the plurality of second objects, where the first object, the plurality of second objects, and the plurality of first connectors are all displayed on a display screen; and
    an interactive graphical editing unit judging movement of a third object while the user is interactively continuously moving the third object on the display relative to the graphic and automatically selecting two or more of the plurality of first connectors when it is judged that the third object has moved into proximity of the two or more connectors and overlapping at least one of the two or more connectors, and in response the two or more connectors are selected by a two-dimensional movement relative to the plurality of first connectors after the first object, the plurality of second objects, and the plurality of first connectors have been displayed, and in response to the selecting automatically creating and displaying a second connector for connecting the displayed first object and the third object, and two or more third connectors for connecting two or more of the displayed second objects connected to the interactively selected first connector and the third object.

9. A graphic editing method, comprising:
displaying a graphic including a first object and a second object which are connected with each other using a first connector, where the first object, second object, and first connector are all displayed on a display screen; and judging movement of a third object while it is interactively moving on the display screen relative to the graphic by a continuous two-dimensional movement and when it is judged that the third object has been so moved to a predetermined overlapping position in relation to the first connector after the first object, second object, and first connecter have been displayed, and in response automatically creating and displaying a second connector for newly connecting the displayed first object and the third object and a third connector for newly connecting the third object and the second object.

10. A graphic editing method, comprising:
displaying a graph including a first object and a second object which are connected with each other using a first connector, where the first object, the second object, and the first connector are all displayed on a display screen; and after the first object, second object, and first connecter have been displayed, judging a user's continuous interactive two-dimensional movement of a third object to determine when during the movement the third object overlaps the first connector, and in response to the determining automatically designating or selecting the first connector as an insertion target by automatically inserting the third object by creating and displaying a second connector for connecting the first object and the third object and a third connector for connecting the third object and the second object.

11. A storage medium on which a program enabling a computer to execute a process is stored, the process comprising:
displaying, by a graphic editing tool, a graphic including a first object and a second object which are connected with each other using a first connector, where the first object, the second object, and the first connector are all displayed on a display screen; and while the first object, second object, and first connecter are being displayed, judging a user's continuous interactive moving of a third object during display of the interactive movement and automatically selecting or designating the first connector when it is judged that the third object has been so interactively placed by the movement to a predetermined position overlapping the first connector, and in response inserting the third object by creating and displaying a second connector for connecting the displayed first object and the third object and a third connector for connecting the third object and the second object.

12. A storage medium on which a program enabling a computer to execute a process is stored, the process comprising:
displaying a graph including a first object and a second object which are connected with each other using a first connector, where the first object, the second object, and the first connector are all displayed on a display screen; and while the first object, second object, and first connecter are being displayed, judging a users interactive continuous two-dimensional movement of a third obiect and when during the movement it is judged that the third object overlaps the first connector automatically treating the first connector as a selected target for insertion by automatically inserting the third object by creating and displaying a second connector for connecting the displayed first object and the third object and a third connector for connecting the displayed third object and the second object.

13. A method of interactively graphically inserting a node into a displayed graph comprising displayed nodes and connectors graphically connecting the nodes, said method comprising:
interactively designating a displayed first connection in the displayed graph, by comparing a position of the first connection with positions of an insertion node or representation thereof as the insertion node or representation thereof is being displayed while being continuously moved by the input device, when the insertion node or representation thereof overlaps the displayed first connection which visually connects a first displayed node and a second displayed node of the displayed graph; and responsive to said interactive designating, automatically inserting the insertion node into the displayed graph by automatically displaying a second connection to newly connect the insertion node to the displayed first node, and by automatically displaying a third connection to newly connect the insertion node to the displayed second node.

14. A graphic editing apparatus, comprising:
a display unit displaying a first object, a second object, and a first connector, the objects being graphically connected with each other by the first connector; and an editing unit, judging a movement of a displayed third object being while it is interactively located by a continuous two-dimensional movement and automatically designating or selecting the first connector when it is judged that the third object is or will overlap or contact the first connector on the display unit as a result of the moving, and in response displaying a second connector to newly graphically connect the displayed first object and the displayed third object, and displaying a third connector to newly graphically connect the third object and the second object.

15. A method, comprising:
interacting with a graphical user interface to designate or select, among connectors of a displayed graph, a connector to be a target for inserting a node between existing edge-connected nodes of the displayed graph by dragging the node over or near the connector connecting the existing nodes, where when it is judged during the dragging that the dragging node is or will overlap the connector the connector is designated or selected; and responsive to the designating or selecting of the node, automatically displaying connectors in the graph to newly connect the existing nodes with the inserted node and automatically undisplaying the connector connecting the existing nodes.

16. A method of displaying on a display, comprising:
displaying first and second graphical nodes and displaying a first graphical line graphically connecting the first and second graphical nodes;

while said displaying, interactively designating the first displayed line as a target for insertion by judging the dragging of a new node graphic and designating or selecting the first displayed line when it is judged that the new node is dragged to a position overlapping the first displayed line; and in response to said interactive designating automatically: undisplaying the selected first line, displaying a new first line and a new second line graphically connecting the new graphical node to the first and second graphical nodes.

17. A method according to claim 11, wherein the interactive placement comprises interactively selecting the first connector by one of (1) dragging the new node over or near the first connector and (2) dropping the new node onto or near the first connector.

18. A method of inserting interactively and graphically connecting a node to a displayed graph, comprising:

displaying the graph;

dragging a graphic node to change a location of the graphic node relative to the displayed graph; and during the dragging judging the dragging and when it is judged that the location of the graphic node comes into a position overlapping a connector connected to an existing node in the graph, automatically treating the connector as an insertion target designated by the dragging by displaying a graph connector newly visually connecting the graphic node to the existing node.

19. A graphic editing apparatus, comprising:

a display unit displaying a graphic including a first object and a second object which are connected with each other using a first connector, where the first object, second object, and first connector are all displayed on a display screen; and an interactive graphical editing unit responding to a judgment that a third object has been interactively placed by a continuous two-dimensional movement on the display screen so as to overlap the first connector after the first object, second object, and first connector have been displayed, by automatically displaying a connector newly connecting the displayed first object and the third object and another connector newly connecting the displayed third object and the second object.

* * * * *

UNITED STATES PATENT AND TRADEMARK OFFICE
CERTIFICATE OF CORRECTION

| | | |
|---|---|---|
| PATENT NO. | : 7,046,246 B2 | Page 1 of 1 |
| APPLICATION NO. | : 09/432113 | |
| DATED | : May 16, 2006 | |
| INVENTOR(S) | : Nobuhiro Saitou | |

It is certified that error appears in the above-identified patent and that said Letters Patent is hereby corrected as shown below:

Title Page - Item [54] Title: after "APPARATUS", insert --,--;

Column 21   Line 46 (claim 1), delete "overtap" and insert --overlap--;

Column 23   Line 65 (claim 12), delete "users" and insert -- user's--;
Line 66 (claim 12), delete "obiect" and insert --object--;

Column 24   Line 53 (claim 15), after "overlap the" delete "connector" and insert --connector,--.

Signed and Sealed this

Seventeenth Day of October, 2006

JON W. DUDAS
*Director of the United States Patent and Trademark Office*